US010224023B2

(12) United States Patent
Chien et al.

(10) Patent No.: US 10,224,023 B2
(45) Date of Patent: Mar. 5, 2019

(54) SPEECH RECOGNITION SYSTEM AND METHOD THEREOF, VOCABULARY ESTABLISHING METHOD AND COMPUTER PROGRAM PRODUCT

(71) Applicant: Industrial Technology Research Institute, Hsinchu (TW)

(72) Inventors: Shih-Chieh Chien, Taichung (TW); Chih-Chung Kuo, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 10 days.

(21) Appl. No.: 15/458,990

(22) Filed: Mar. 15, 2017

(65) Prior Publication Data

US 2018/0166069 A1 Jun. 14, 2018

(30) Foreign Application Priority Data

Dec. 13, 2016 (TW) .............................. 105141155 A

(51) Int. Cl.
*G10L 15/02* (2006.01)
*G10L 15/06* (2013.01)
(Continued)

(52) U.S. Cl.
CPC ............ *G10L 15/063* (2013.01); *G10L 15/02* (2013.01); *G10L 15/04* (2013.01); *G10L 15/05* (2013.01); *G10L 2015/0635* (2013.01)

(58) Field of Classification Search
CPC ......... G10L 13/10; G10L 13/08; G10L 15/22; G06F 1/26; G06F 3/147
See application file for complete search history.

(56) References Cited

U.S. PATENT DOCUMENTS 6,912,499 B1 6/2005 Sabourin et al.
7,275,034 B2 9/2007 Odell et al.
(Continued)

FOREIGN PATENT DOCUMENTS

CN 101650943 2/2010
CN 102074234 5/2011
(Continued)

OTHER PUBLICATIONS

"Office Action of Taiwan Counterpart Application," dated Jun. 2, 2017, p. 1-3.

*Primary Examiner* — Pierre Louis Desir
*Assistant Examiner* — Yi Sheng Wang
(74) *Attorney, Agent, or Firm* — JCIPRNET

(57) ABSTRACT

A speech recognition system and method thereof, a vocabulary establishing method and a computer program product are provided. The speech recognition method includes: storing a speech recognition model including speech-units and basic components of acoustic models, wherein each of the speech-units includes at least one state and each state corresponds to one of the basic components of acoustic models; receiving first and second speech signals; obtaining a speech-unit sequence of a native/non-native vocabulary from a speech-analysis and unit-expansion module; recognizing the first speech signal according to the speech recognition model and the speech-unit sequence of the native/non-native vocabulary and further outputting a recognition result; and selecting an optimal component from the basic components of acoustic models according to the speech recognition model, the second speech signal, and the word corresponding to the second speech signal, and further updating the speech-units according to the best basic component of acoustic model.

31 Claims, 16 Drawing Sheets

(51) Int. Cl.
*G10L 15/04* (2013.01)
*G10L 15/05* (2013.01)

(56) References Cited

U.S. PATENT DOCUMENTS

| | | |
|---|---|---|
| 7,415,411 B2 | 8/2008 | Reinhard et al. |
| 8,301,446 B2 | 10/2012 | Shu |
| 8,768,704 B1 | 7/2014 | Fructuoso et al. |
| 2005/0197837 A1* | 9/2005 | Suontausta ........... G10L 15/005 704/260 |
| 2005/0240397 A1 | 10/2005 | Jeon |
| 2013/0006623 A1* | 1/2013 | Chelba ................. G10L 15/187 704/233 |
| 2013/0289992 A1* | 10/2013 | Harada .................. G10L 15/20 704/249 |
| 2016/0284345 A1* | 9/2016 | Ji ........................... G10L 15/08 |
| 2017/0116994 A1* | 4/2017 | Wang .................... G10L 15/144 |
| 2017/0148444 A1* | 5/2017 | Bocklet ................. G10L 17/22 |
| 2017/0154620 A1* | 6/2017 | Berthelsen ............. G10L 15/16 |

FOREIGN PATENT DOCUMENTS

| | | |
|---|---|---|
| TW | 200937388 | 9/2009 |
| TW | 201216253 | 4/2012 |
| TW | 1413105 | 10/2013 |
| TW | 1536366 | 6/2016 |

\* cited by examiner

| | Utt-1 | Utt-2 | Utt-3 | Utt-4 | Utt-5 |
|---|---|---|---|---|---|
| state-0 | M101 1<br>M90 0.9935<br>M30 0.9869 | M90 1.9935<br>M101 1.9804<br>M33 1.9608 | M101 2.9739<br>M33 2.9542<br>M90 2.9542 | M101 3.9673<br>M33 3.9281<br>M90 3.9085 | M101 4.9673<br>M33 4.9216<br>M90 4.8954 |
| | ⋮ ⋮ | ⋮ ⋮ | ⋮ ⋮ | ⋮ ⋮ | ⋮ ⋮ |
| state-1 | M115 1<br>M50 0.9935<br>M38 0.9869 | M50 1.9739<br>M41 1.9412<br>M35 1.9085 | M50 2.9673<br>M41 2.9216<br>M35 2.8497 | M41 3.9216<br>M35 3.817<br>M38 3.7582 | M41 4.9216<br>M35 4.7386<br>M38 4.732 |
| | ⋮ ⋮ | ⋮ ⋮ | ⋮ ⋮ | ⋮ ⋮ | ⋮ ⋮ |
| state-2 | M93 1<br>M44 0.9935<br>M10 0.9869 | M93 1.9935<br>M44 1.9739<br>M23 1.9608 | M93 2.9804<br>M44 2.9673<br>M23 2.9608 | M93 3.9673<br>M44 3.9673<br>M23 3.9412 | M93 4.9673<br>M44 4.9542<br>M23 4.8954 |
| | ⋮ ⋮ | ⋮ ⋮ | ⋮ ⋮ | ⋮ ⋮ | ⋮ ⋮ |

FIG. 11

SPEECH RECOGNITION SYSTEM AND METHOD THEREOF, VOCABULARY ESTABLISHING METHOD AND COMPUTER PROGRAM PRODUCT

CROSS-REFERENCE TO RELATED APPLICATION

This application claims the priority benefit of Taiwan application serial no. 105141155, filed on Dec. 13, 2016. The entirety of the above-mentioned patent application is hereby incorporated by reference herein and made a part of this specification.

TECHNICAL FIELD

The disclosure relates to a speech recognition system, a speech recognition method, a vocabulary establishing method and a computer program product that are capable of generating speech-units according to a non-native speech and performing a speech recognition using the speech-units.

BACKGROUND

The conventional speech recognition systems are mostly based on a single language. In the case of multiple-or mixed-language speech recognition, it is common to establish a speech recognition model for a second language (e.g., English) other than a first language (e.g., Chinese) or establish a corresponding relationship between the speech-units of the first language and the speech-units of the second language. Then, the speech recognition model for a single language is adopted to perform the multiple-or mixed-language speech recognition. However, such speech recognition may have some challenges to overcome.

Taking the case of Chinese and English bilingual mixed speech recognition, where Chinese is taken as the native language (i.e., first language) and English is taken as the second language. To train the speech recognition model for speech recognition, it normally requires a significant number of training materials. And the training materials are more easily to collect through recordings of native speakers, i.e., recording the English materials from American people and recording the Chinese materials from Chinese people. However, when training is performed individually for the respective speech recognition models and put the two models together for bilingual mixed speech recognition, either for Chinese's bilingual speech or for American's bilingual speech, the recognition rate is not desirable due to the mismatch accent and can not put the bilingual mixed speech recognition system into practice. Besides, it is difficult to collect and check English materials recorded by the native Chinese speakers due to the pronunciations of the same English word pronounced by different Chinese native speakers may differ significantly. Therefore, through using above poor-quality materials for English speech modeling, it is difficult to come out with a Chinese-accented-English speech recognition system whose performance is as well as the Chinese one, using of the native Chinese speech materials for Chinese speech modeling. Therefore, the resources and efforts required for the multiple-or mixed-language speech recognition are much higher than those required for the single language.

It should be noted that, the native language is the main communication language in local, the frequency of using other languages is normally lower except for the so-called non-native words or foreign words (also referred to as "loan blends"). Moreover, the non-native words or foreign words are updated frequently. Besides, it is noticed that the local users normally speak in local accent. According to the conventional methods for multiple-or mixed-language modeling, a large number of training materials for other languages in local accent are required. For example, the Chinese-accented English materials are required for the modeling of Chinese-accented English speech recognition. However, such materials are not easily to collect.

Therefore, how to establish a speech recognition system capable of recognizing the non-native words, or even providing a speech recognition system for the mixed-lingual in native and non-native languages, without excessively consuming resources, thereby enabling broad applications of such speech recognition system, is certainly an issue for the researchers in this field.

SUMMARY

The disclosure provides a speech recognition system, a speech recognition method, a vocabulary establishing method and a computer program product that generate speech-units according to non-native speech and performing a speech recognition using the speech-units.

The disclosure provides a speech recognition system. The system includes a storage unit and a processing unit. The storage unit stores a speech recognition model. The speech recognition model has a plurality of speech-units and a plurality of basic components of acoustic models. Each of the speech-units has at least one state, and each of the state corresponds to at least one of the basic components of acoustic models. The processing unit operates a plurality of modules. The modules include a "speech-analysis and unit-expansion module", an "input module", a "native/non-native words retrieving module", and a "speech recognizer". The "input module" receives a first speech signal. The "native/non-native words retrieving module" obtains a speech-unit sequence of a native/non-native word from the "speech-analysis and unit-expansion module". The "speech recognizer" recognizes the first speech signal based on the speech recognition model and the speech-unit sequence of the native/non-native word and output a recognition result. The "speech-analysis and unit-expansion module" selects an optimal component based on the speech recognition model, a second speech signal received by the "input module", and a word received by the "input module" corresponding to the second speech signal, and updates the speech-units based on the optimal component.

The disclosure provides a speech recognition method. The speech recognition method includes: storing a speech recognition model having a plurality of speech-units and a plurality of basic components of acoustic models, wherein each of the speech-units has at least one state, and each of the state corresponds to at least one of the basic components of acoustic models; receiving a first speech signal; obtaining a speech-unit sequence of a native/non-native word from the "speech-analysis and unit-expansion module", recognizing the first speech signal based on the speech recognition model and the speech-unit sequence of the native/non-native word, and outputting a recognition result; receiving a second speech signal and a word corresponding to the second speech signal, and selecting an optimal component from the basic components of acoustic models based on the speech recognition model, the second speech signal, and the word corresponding to the second speech signal, and updating the speech-units based on the optimal component.

The disclosure provides a vocabulary establishing method. The vocabulary establishing method includes: storing a speech recognition model having a plurality of speech-units and a plurality of basic components of acoustic models, wherein each of the speech-units has at least one state, and each of the state corresponds to at least one of the basic components of acoustic models; receiving a speech signal; selecting an optimal component from the basic components of acoustic models based on the speech recognition model, the speech signal, and the word corresponding to the speech signal, and updating the speech-units based on the optimal component.

The disclosure provides a computer program product for speech recognition. After a computer loads and executes the computer program, the aforementioned speech recognition method is performed.

As above, the speech recognition system, the speech recognition method, the vocabulary establishing method, and the computer program product of the disclosure are capable of recognizing the non-native word without recording a large number of materials in a non-native language and retraining the acoustic model. Particularly, when adding the speech-unit into the speech recognition model for recognizing the non-native word speech, the recognition performance for the speech in native language will not be affected by the model update.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIG. 11 is a schematic view illustrating operation of the "basic component composition table" according to an exemplary embodiment.

DETAILED DESCRIPTION OF DISCLOSED EMBODIMENTS

Figure 1:
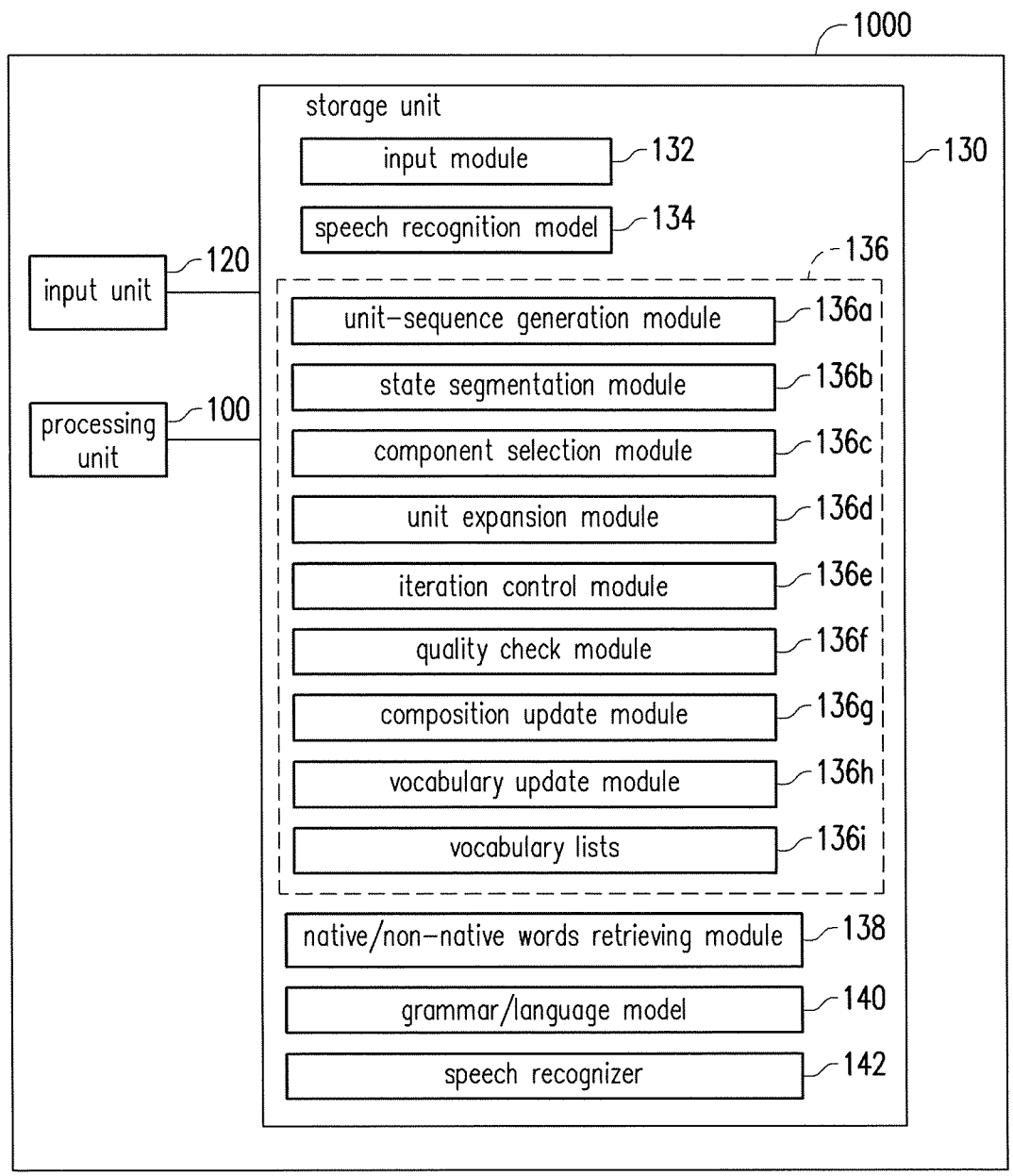
FIG. 1 is a schematic view illustrating a speech recognition system according to an exemplary embodiment.

FIG. 1 is a schematic view illustrating a speech recognition system according to an exemplary embodiment. Referring to FIG. 1, in the exemplary embodiment, a speech recognition system 1000 includes a "processing unit" 100, an "input unit" 120 and a "storage unit" 130. The "input unit" 120 is coupled to the "storage unit" 130. The "storage unit" 120 is coupled to the "processing unit" 100. The speech recognition system 1000 is, for example, a mobile device, a personal digital assistant (PDA), a notebook computer, a tablet computer, a conventional desktop computer or other electronic devices, but is not limited thereto.

The "processing unit" 100 is, for example, a general purpose processor, a special purpose processor, a traditional processor, a digital signal processor, a plurality of microprocessors, one or more microprocessors combined with a digital signal processor core, a controller, a microcontroller, an application specific integrated circuit (ASIC), a field programmable gate array (FPGA) circuit, any other types of integrated circuits, a state machine, a processor based on an advanced RISC machine (ARM), and the like.

The "input unit" 120 is, for example, a device or element for receiving a speech signal and a phonetic symbol or a word of the speech signal and providing the speech signal and the phonetic symbol or the word of the speech signal being received to the "storage unit" 130. For instance, the "input unit" 120, for example, includes a microphone for capturing the speech signal and a device for inputting the phonetic symbol or the word of the speech signal. Alternatively, the "input unit" 120 may also be a device for receiving the speech signal and the phonetic symbol or the word of the speech signal from other sources (for example, other devices or storage media).

The "storage unit" 130 is, for example, any form of fixed or movable random access memory (RAM), read-only memory (ROM), flash memory, hard disk, or other similar devices or a combination of these devices.

In the exemplary embodiment, the "storage unit" 130 stores an "input module" 132, a "speech recognition model" 134, a "speech-analysis and unit-expansion module 136", a "native/non-native words retrieving module" 138, a "grammar/language model" 140 and a "speech recognizer" 142. In particular, the "speech-analysis and unit-expansion module" 136 includes a "unit-sequence generation module" 136a, a "state segmentation module" 136b, a "component selection module" 136c, a "unit expansion module" 136d, an "iteration control module" 136e, a "quality check module" 136f, a "composition update module" 136g, a "vocabulary update module" 136h, and a "vocabulary lists" 136i. Each of the modules has one or more code segments, respectively. After the code segment is installed, the code segment is executed by the "processing unit" 100. For example, the "processing unit" 100 respectively executes each operation of a speech recognition method of the disclosure through these modules.

In particular, the "speech recognition model" 134 includes a plurality of speech-units and a plurality of basic components of acoustic models. Each of the speech-units includes at least one state and each of the state corresponds to at least one of the basic components of acoustic models.

Figure 2:
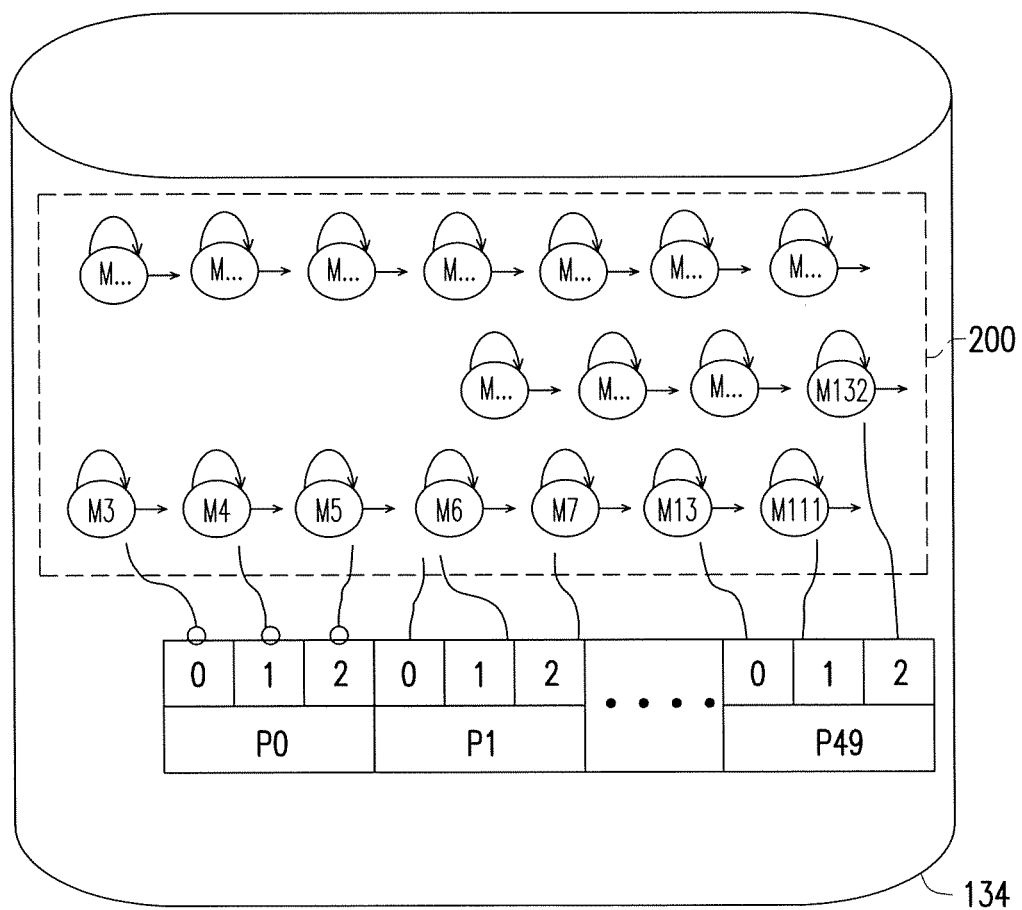
FIG. 2 is a schematic view illustrating a "speech recognition model" according to an exemplary embodiment.

FIG. 2 is a schematic view illustrating a "speech recognition model" according to an exemplary embodiment.

Referring to FIG. 2, the "speech recognition model" 134 includes a plurality of speech-units. For example, the "speech recognition model" 134 includes speech-units P0 to P49. In particular, in this exemplary embodiment, one speech-unit represents a Chinese phone. For example, the speech-unit P0 represents the null consonant /Ø/ in Chinese (symbolized as [ʔ] in the International Phonetic Alphabet (IPA)), the speech-unit P1 represents the consonant /ㄅ/ in Chinese, namely, the consonant [p], the speech-unit P2 represents the consonant /ㄆ/ in Chinese, namely, the consonant [pʰ], the speech-unit P49 represents the second vowel [ㄛ] of the diphthong /ㄡ/ in Chinese, and so on.

In addition, each of the speech-units has one to more states. In the exemplary embodiment, each of the speech-units has three states. For example, the speech-unit P0 includes a $0^{th}$ state, a $1^{st}$ state and a $2^{nd}$ state of the speech-unit P0; the speech-unit P1 includes a $0^{th}$ state, a $1^{st}$ state and a $2^{nd}$ state of the speech-unit P1, and so on. Furthermore, the "speech recognition model" 134 further includes a plurality of basic components of acoustic models. For simplicity, FIG. 2 illustrates the basic components of acoustic models 200 to represent all of the basic components of acoustic models included in the "speech recognition model" 134.

In particular, a state of a speech-unit corresponds to one or more basic components of acoustic models. In this exemplary embodiment, a state corresponds to a basic component of acoustic model. Take the speech-unit P0 as an example, the $0^{th}$ state of P0 corresponds to the basic component of acoustic model M3 of the basic components of acoustic models 200. The basic component of acoustic model M3 serves to describe the $0^{th}$ state of P0. The $1^{st}$ state of P0 corresponds to the basic component of acoustic model M4 of the basic components of acoustic models 200. The basic component of acoustic model M4 serves to describe the $1^{st}$ state of P0. The $2^{nd}$ state of P0 corresponds to the basic component of acoustic model M5 of the basic components of acoustic models 200. The basic component of acoustic model M5 serves to describe the $2^{nd}$ state of the P0.

In brief, in the exemplary embodiment, a Chinese phone is represented by a speech-unit, and the speech-unit includes a $0^{th}$ state, a $1^{st}$ state, and a $2^{nd}$ state. Each state is described by a basic component of acoustic model.

In this exemplary embodiment, the speech-units included in the "speech recognition model" 134 may be further divided into native speech-units and new speech-units. In the beginning, the speech recognition system 1000 only includes native speech-units (for example, speech-units in Chinese). After being processed by the speech recognition method of the disclosure, the "speech recognition model" 134 is added with many new speech-units (for example, the speech-units for describing English speech). These new speech-units serve to describe the speech in non-native language.

Figure 3:
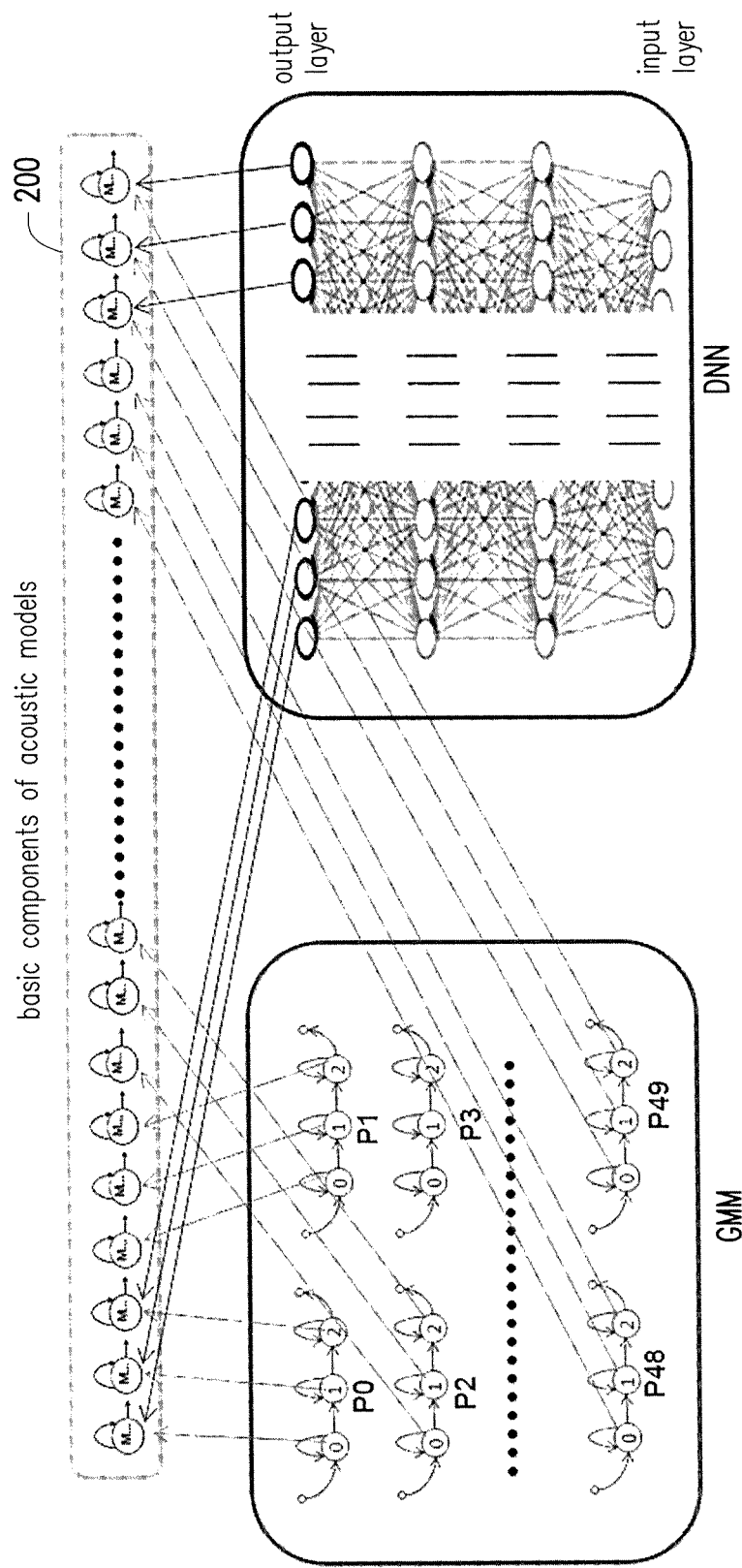
FIG. 3 is a schematic view illustrating the basic components of acoustic models according to an exemplary embodiment.

FIG. 3 is a schematic view illustrating the basic components of acoustic models according to an exemplary embodiment.

Referring to FIG. 3, FIG. 3 describes an example of the basic components of acoustic models 200 in FIG. 2. The basic components of acoustic models 200 may be formed by the Gaussian mixture models (GMM) or represented by the outputs in the output-layer of neural networks (NN) or deep neural networks (DNN). In addition, two transition probabilities of self-transition and transition-out describe the probability of staying or leaving the basic component of acoustic model. More detailed implementations about training and operation for GMM or NN/DNN can be obtained from conventional technology, and are not described here.

Figure 4A:
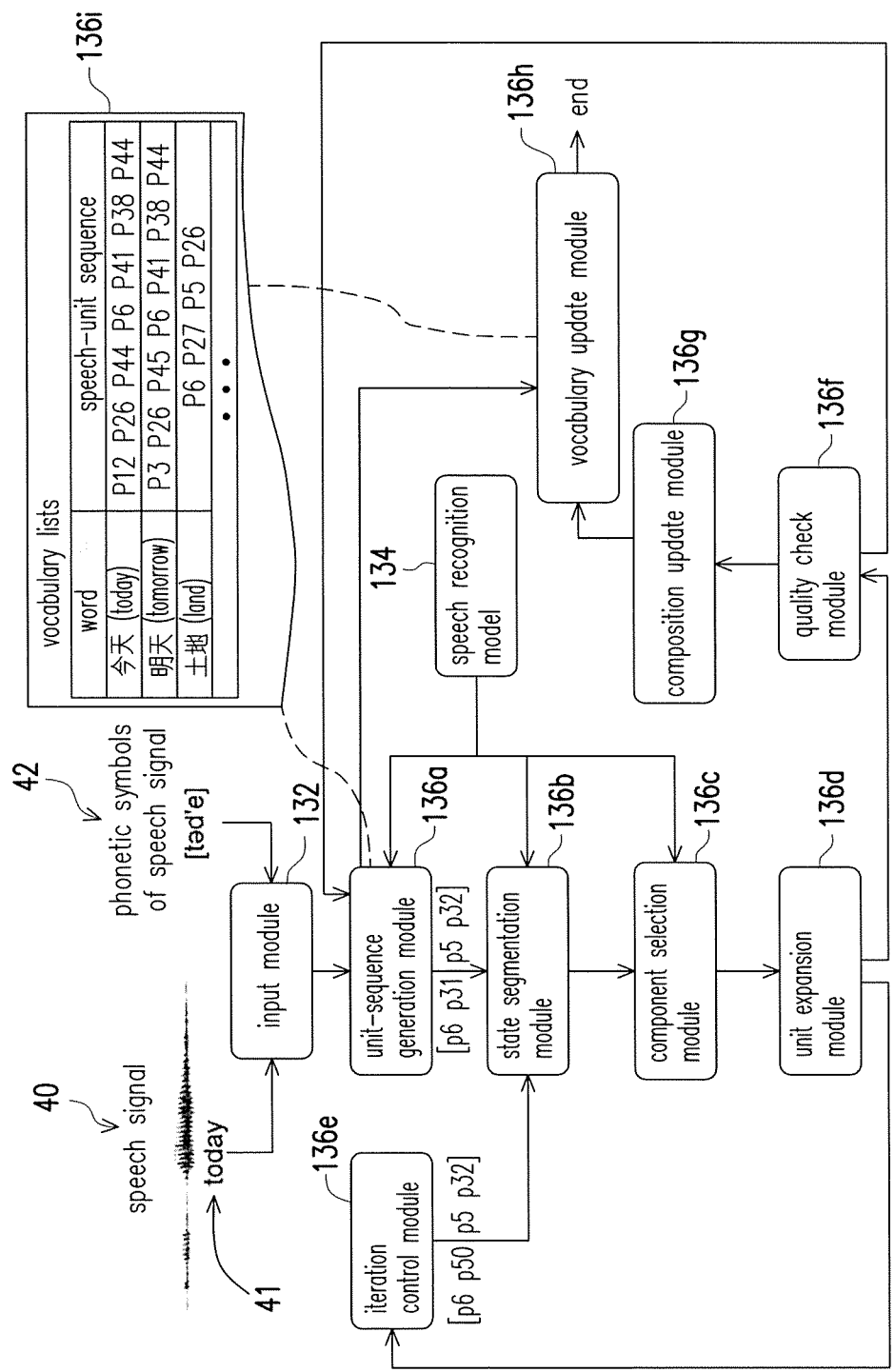
FIG. 4A is a schematic view illustrating the operations of respective modules in a speech recognition system according to an exemplary embodiment.
Figure 4B:
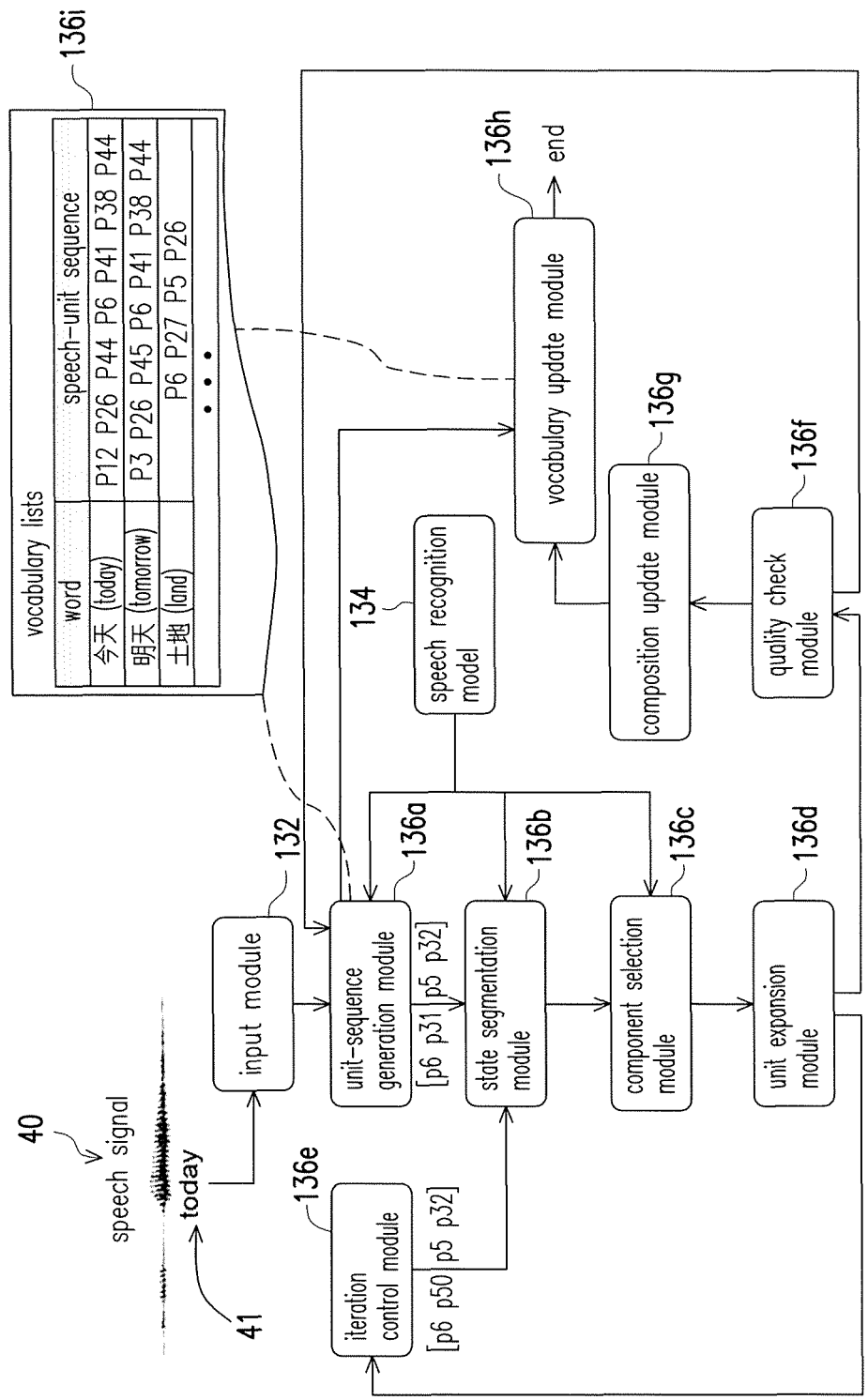
FIG. 4B is a schematic view illustrating the operations of respective modules in a speech recognition system according to another exemplary embodiment.

FIG. 4A is a schematic view illustrating the operations of respective modules in a speech recognition system according to an exemplary embodiment, and FIG. 4B is a schematic view illustrating the operations of respective modules in a speech recognition system according to another exemplary embodiment.

Referring to FIG. 4A, first of all, the "input module" 132 receives a speech signal 40 (also referred to as "second speech signal") of a new word 41 and the phonetic symbols 42 corresponding to the speech signal. In this exemplary embodiment, the new word 41 is "today". The phonetic symbols 42 corresponding to this word 41 are /tə d'e/ (Note: For the convenience, the phonetic symbol indicated here is in KK phonetic symbols. Various types of suitable phonetic symbols or code systems can also be used as long as the pronunciation can be precisely represented). Then, the "input module" 132 receives the speech signal 40 of "today", the word 41 of "today", and the corresponding phonetic symbols 42 into the "unit-sequence generation module" 136a. However, it is necessary to note that, referring to FIG. 4B, in another exemplary embodiment, when the "input module" 132 only receives the speech signal 40 and the word 41, the "input module" 132 may also receive only the speech signal 40 and the word 41 into the "unit-sequence generation module" 136a. In such case, the speech recognition system 1000 may execute an operation of the "unit-sequence generation module" 136a based only on the speech signal 40 and the word 41 to execute the operation of the "unit-sequence generation module" 136a. The detailed process for the operation of the "unit-sequence generation module" 136a based only on the speech signal 40 and word 41 are described in the subsequent paragraphs.

Referring to FIG. 4A again, the "unit-sequence generation module" 136a may receive the speech signal 40, the word 41, and the phonetic symbols 42. The "unit-sequence generation module" 136a may refer to the "vocabulary lists" 136i with a predetermined vocabulary and look for the corresponding speech-unit sequence of the word 41. If the vocabulary lists 136i contains the speech-unit sequence corresponding to the word 41 "today", and only one speech-unit sequence is available, the speech-unit sequence is directly processed by the "state segmentation module" 136b. If there are a plurality of speech-unit sequences corresponding to the word 41 in the vocabulary lists 136i, the speech-unit sequences may be accessed in sequence for processing by the "state segmentation module" 136b. Then, the "state segmentation module" 136b may perform the state-level segmentation based on the speech signal 40 to generate a plurality of speech segments. However, if there is no speech-unit sequence in the vocabulary lists 136i corresponding to the word 41, the "unit-sequence generation module" 136a may generate a speech-unit sequence corresponding to the phonetic symbols 42 based on the speech-units P0 to P49 of the "speech recognition model" 134.

For phonetic to speech-unit conversion, the "unit-sequence generation module" 136a may include the substitution conversion, the insertion conversion, and the deletion conversion.

Figure 5A:
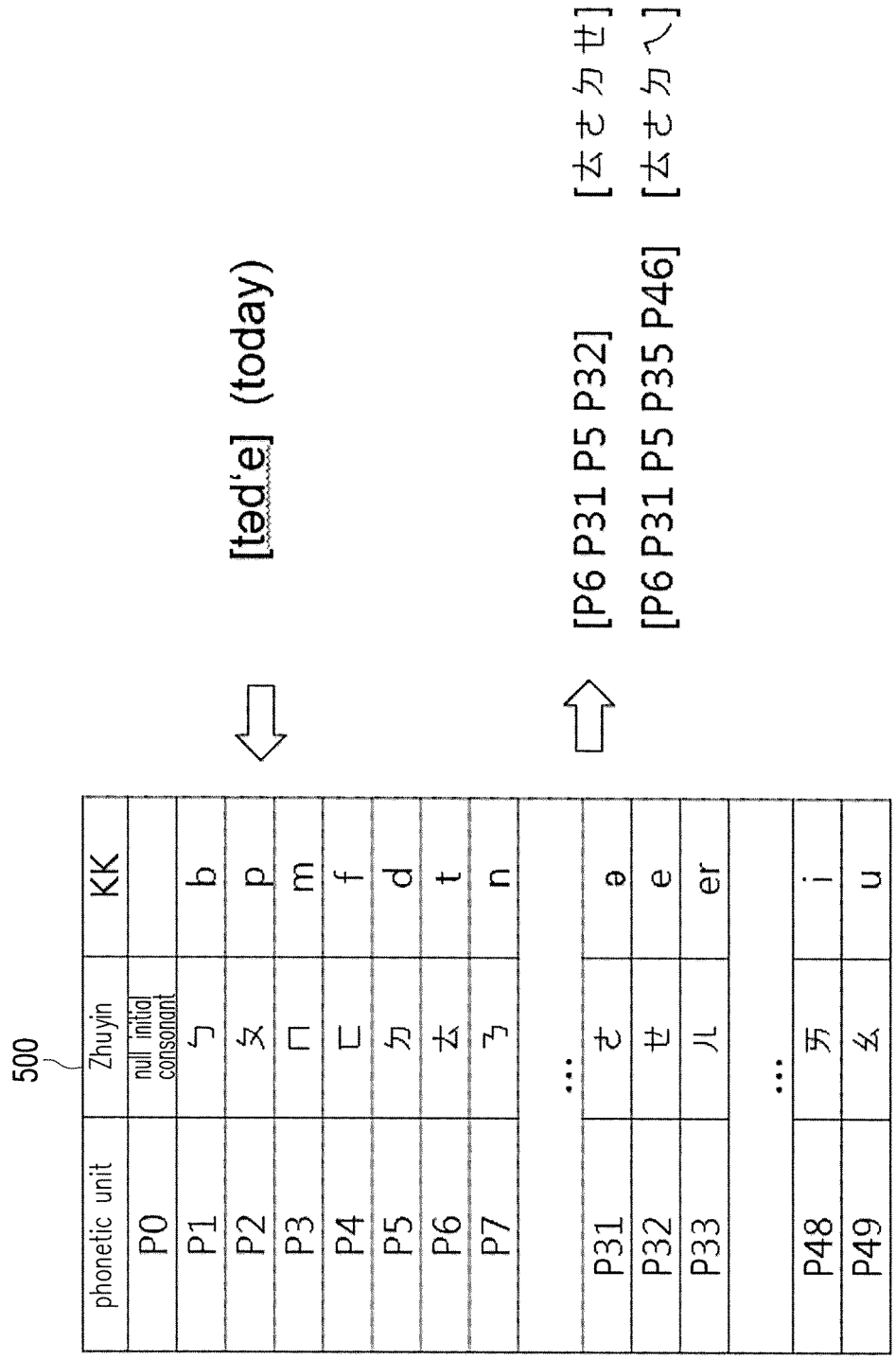
FIG. 5A is a schematic view illustrating a substitution conversion of the "unit-sequence generation module" according to an exemplary embodiment.

FIG. 5A is a schematic view illustrating a substitution conversion of the "unit-sequence generation module" according to an exemplary embodiment.

Referring to FIG. 5A, the "unit-sequence generation module" 136a may receive the phonetic symbol 42 and output one or more speech-unit sequences based on the conversion table 500. The speech-unit sequence outputted by the "unit-sequence generation module" 136a represents the pronunciation (or the similar pronunciation) of the English word "today" in Chinese speech-units.

For the substitution conversion, a corresponding relationship between Chinese phonetic symbols and English KK phonetic symbols may be stored in advance in the conversion table 500. The "unit-sequence generation module" 136a may output a speech-unit sequence [P6 P31 P5 P32] in Chinese speech-units based on the phonetic symbols /tə d'e/. Alternatively, for the ease of reading for Taiwanese people, a representation /ㄊㄜㄉㄝ/ of Zhuyin, a Chinese phonetic symbol system, may serve to roughly represent the pronunciation. In addition, the "unit-sequence generation module" 136a may also output a speech-unit sequence [P6 P31 P5 P35 P46] (or /ㄊㄜㄉ/ ㄟ/ in Zhuyin) whose pronunciation is also similar to /tə d'e/ of the KK phonetic symbol representation. It should be noted that the representations of Zhuyin phonetic symbols and KK phonetic symbols are used for the reading convenience of ordinary people. The precise representation should be based on the International Phonetic Alphabet (IPA) or X-SAMPA symbols corresponding to IPA. For example, P48 and P49 in the conversion table 500 respectively represent only the second vowels [ɪ] and [ʊ] (IPA symbols) of the diphthongs /ㄟ/ and /ㄠ/. Therefore, the precise phonetic symbol of the Chinese Zhuyin phonetic symbol /ㄟ/ corresponds to the speech-unit P35 (i.e., the first vowel [e] represented by IPA for the diphthong /ㄟ/) and the speech-unit P46 (i.e., the second vowel [ɪ] represented by IPA for the diphthong /ㄟ/).

In addition, the disclosure is not limited by a man-made corresponding relationship between Chinese phonetic symbols and English phonetic symbols. The corresponding relationship between the Chinese and English phonetic symbols may be carried out in multiple ways. In an exemplary embodiment, the speech-units corresponding to Chinese phonetic symbols and the speech-units corresponding to English phonetic symbols may be stored in advance. The speech-units corresponding to the Chinese phonetic symbols and the speech-units corresponding to the English phonetic symbols may be represented by a vector of distinctive features. An extent to which a speech-unit corresponding to a Chinese phonetic symbol and a speech-unit corresponding to an English phonetic symbol are similar to each other may be determined by calculating a vector distance. In another embodiment, a Chinese corpora and an English corpora may be used to calculate confusion matrices between respective speech-units in the languages, so as to obtain distances between the speech-units of the languages. In yet another embodiment, acoustic models of Chinese and English speech recognizers may serve to calculate a distance between the models, thereby obtaining distances between the speech-units of the languages. Accordingly, the speech-unit sequence similar to the pronunciation of the input word may be obtained.

In addition, after generation of the speech-unit sequence through the substitution conversion, the "unit-sequence generation module" 136a may further modify the generated speech-unit sequence by adopting the insertion conversion or the deletion conversion.

For example, the "unit-sequence generation module" 136a may adopt the insertion conversion to insert a speech-unit of a specific type into consecutive speech-units of a specific type in the generation of speech-unit sequence. For example, in an exemplary embodiment, the "unit-sequence generation module" 136a may determine a conversion rule based on the phonotactics of the native language. Taking Chinese as an example, the syllable structure of Chinese is IGVC. Specifically, "I" stands for "initial" and means initial consonant. "G" stands for "Glide" and means medial consonant, such as /一/, /ㄨ/, or /ㄩ/ in the Chinese phonetic symbols. "V" stands for "Vowel", and means vowel. "C" stands for "Coda", and means a consonant at the end of the syllable, such as [ɪ], [i], [ʊ], [ʉ],[n], or [ŋ].

Taking the English word "yesterday" as an example, a speech-unit sequence [P41 P38 P21 P6 P33 P5 P35 P46] may be generated from the word through the substitution conversion, and the word may be roughly represented as /一ㄝㄙㄊㄦㄉㄟ/ in Zhuyin phonetic symbols. Then, a new speech-unit sequence [P41 P38 P21 P40 P6 P33 P5 P35 P46] may be generated through insertion conversion, and may be roughly represented as /一ㄝㄙ帀ㄊㄦㄉㄟ/ in Zhuyin phonetic symbols. The Chinese syllable structure only permits consecutive consonants when a medial consonant follows an initial consonant. Therefore, in the example, a vowel /帀/ is required between the consecutive consonants /ㄙ/ and /ㄊ/. In other words, due to the nature of the pronunciation of Chinese, the vowel /帀/ (the speech-unit P40) may be additionally inserted between the consonant /ㄙ/ (the speech-unit P21) and the consonant /ㄊ/ (the speech-unit P6). It is noted herein that /帀/ is a reversed symbol of /业/, and is a rhyming part adopted when /ㄙ/ is not followed by other symbols of rhyming part. /帀/ is commonly omitted. For example, the Zhuyin representation of "桑" is /ㄙㄤ/, and the Zhuyin representation of /斯/. should be /ㄙ帀/, but the rhyming part symbol /帀/ is habitually omitted to simplify the representation of /ㄙ帀/ into /ㄙ/.

Besides, the "unit-sequence generation module" 136a may adopt the deletion conversion to delete a speech-unit of a specific type between consecutive speech-units of a specific type in the generation of speech-unit sequence. Implementation of the deletion conversion is similar to that of the insertion conversion. For example, since only six coda consonants, i.e., [ɪ], [i], [ʊ], [ʉ], [n], [ŋ], are permitted in the syllable structure of Chinese, while more coda consonants are available in English, a coda consonant not permitted in Chinese may be omitted in the pronunciation. Therefore, the corresponding speech-unit may be deleted.

Taking the English word "word" as an example, a speech-unit sequence [P42 P33 P5] may be generated from the word by using the substitution conversion, and the word may be roughly represented as /ㄨㄦㄉ/ in Zhuyin phonetic symbols. Then, through the deletion conversion, a new speech-unit sequence [P42 P33] may be generated, and roughly be represented as /ㄨㄦ/ in Zhuyin phonetic symbols. This is because the consonant /ㄉ/ does not appear at the coda of the syllable. Therefore, many Chinese native speakers may naturally omit /ㄋ/ in the pronunciation. Therefore, in the example, the coda consonant /ㄋ/ may be deleted. Namely, the speech-unit P5 in the original speech-unit sequence [P42 P33 P5] may be omitted.

It should be noted that, in the exemplary embodiment of FIG. 4B, the "unit-sequence generation module" 136a does not perform the conversion of phonetic symbols. In other words, the input module 132 is not required to receive the phonetic symbol 42 corresponding to the speech signal 40. The "unit-sequence generation module" 136a may generate the speech-unit sequence corresponding to the speech signal 40 by performing the speech recognition directly based on the input speech signal 40.

Figure 5B:
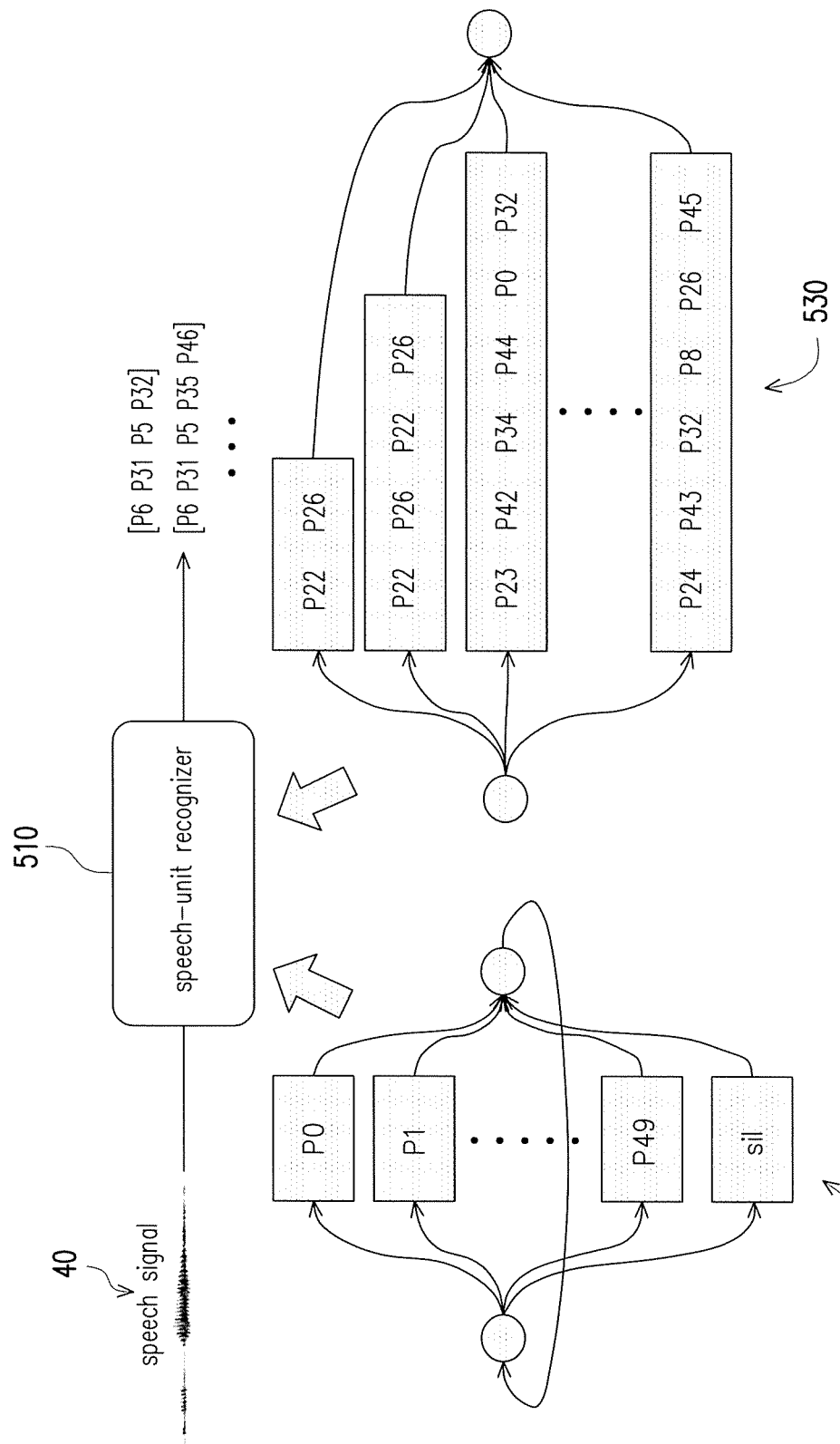
FIG. 5B is a schematic view illustrating generating a speech-unit sequence based on a speech signal according to an exemplary embodiment.

For example, FIG. 5B is a schematic view illustrating generating a speech-unit sequence based on a speech signal according to an exemplary embodiment.

Referring to FIG. 5B, in the exemplary embodiment, the "unit-sequence generation module" 136a includes a "speech-unit recognizer" 510. When the "unit-sequence generation module" 136a only receives the speech signal 40 and the word 41 from the input module, the "speech-unit recognizer" 510 may analyze the speech signal 40 to determine the speech-unit sequence forming the word 41. For example, in an exemplary embodiment, since the speech recognition model 134 stores a plurality of speech-units (e.g., the speech-units P0 to P49 and a speech-unit sil, as represented by a speech-unit 520 in FIG. 5B), the "speech-unit recognizes" 510 may repetitively compare the speech signal 40 with the speech-units to find out the best-matching speech-units corresponding to the speech segments in the speech signal 40, so as to form the speech-units into the speech-unit sequence. Alternatively, in another exemplary embodiment, a speech recognition system 1000 may store speech-unit sequences (e.g., a plurality of speech-unit sequences 530 in FIG. 5B, also referred to as "predetermined speech-unit sequences") corresponding to different words in advance. The "speech-unit recognizer" 510 may select the best-matching speech-unit sequence for the speech signal 40 from the predetermined speech-unit sequences.

Particularly, since one or more descriptions may be available when the pronunciation of an English word is described or simulated with the Chinese phonetic symbols, there may be one or more speech-unit sequences generated by the "unit-sequence generation module" 136a (or the speech recognizer 510), such as the speech-unit sequence [P6 P31 P5 P32] and the speech-unit sequence [P6 P31 P5 P35 P46] obtained by the "speech-unit recognizer" 510 in FIG. 5B. When the "unit-sequence generation module" 136a generates the speech-unit sequences corresponding to the speech signal 40, the speech recognition system 1000 may choose one of the generated speech-unit sequences for the subsequent procedure. Besides, the speech recognition system 1000 may also repetitively choose a different speech-unit sequence from the generated speech-unit sequences to repetitively execute the operations of respective modules in FIG. 4B.

Referring to FIGS. 4A and 4B, it is assumed that the "unit-sequence generation module" 136a generates the speech-unit sequence [P6 P31 P5 P32] (also referred to as "first speech-unit sequence") corresponding to "today". Then, the "state segmentation module" 136b may perform force-alignment based on the speech signal 40 and the speech-unit sequence [P6 P31 P5 P32] to generate a plurality of speech segments.

Figure 6:
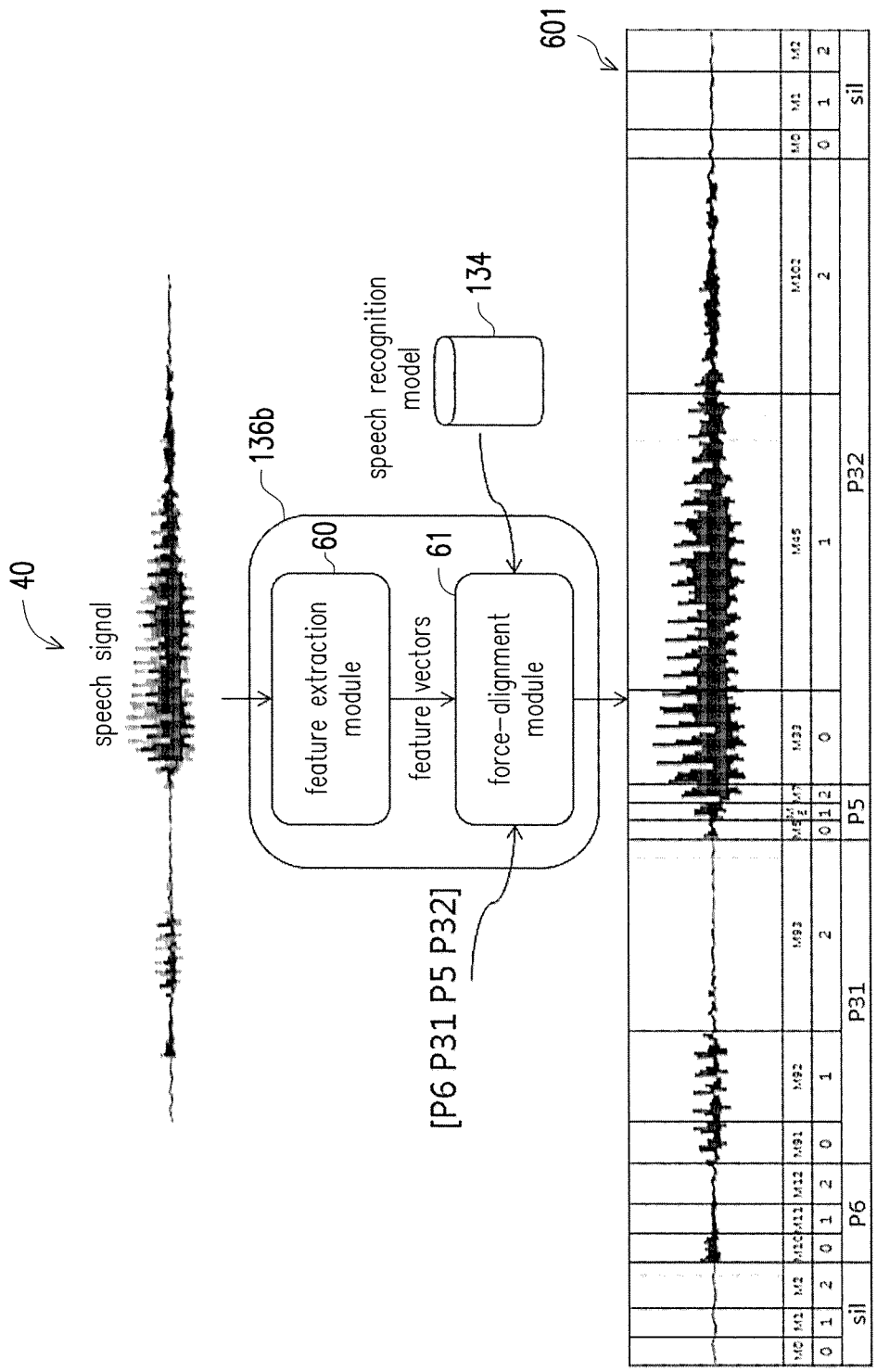
FIG. 6 is a schematic view illustrating force-aligning a speech signal according to an exemplary embodiment.

FIG. 6 is a schematic view illustrating force-aligning a speech signal according to an exemplary embodiment.

Referring to FIG. 6, the "state segmentation module" 136b may include a "feature extraction module" 60 and a "force-alignment module" 61. The "feature extraction module" 60 may extract a plurality of feature vectors from the speech signal 40. Then, the "force-alignment module" 61 may compare and align the speech signal 40 based on the speech-unit sequence [P6 P31 P5 P32] generated by the "unit-sequence generation module" 136a. Generally speaking, the process of comparing and aligning the speech signal 40 is a "force-alignment" process. In other words, the process is executed to look for the optimal segments of the speech signal 40 corresponding to the basic components of acoustic models of the given speech-unit sequence.

In a speech signal, there may be a silence (represented as "sil" in FIG.6) before and after the speech-unit sequence, an optional speech-unit sil (i.e., optional silence) are commonly added to the beginning and end of the speech-unit sequence to account for possible silence segments. In other words, the "force-alignment module" 61 may segment (or perform force alignment on) the speech signal 40 based on possible speech-unit sequences, the speech-unit sequence [P6 P31 P5 P32], the speech-unit sequence [sil P6 P31 P5 P32], the speech-unit sequence [P6 P31 P5 P32 sil], and the speech-unit sequence [sil P6 P31 P5 P32 ], so as to obtain a best-matching speech-unit sequence and output the best one as result. Specifically, taking the speech-unit sequence [sil P6 P31 P5 P32 sil] as an example, the "force-alignment module" 61 may perform the force-alignment on the basic component of acoustic model M0, the basic component of acoustic model M1, and the basic component of acoustic model M2 corresponding to the $0^{th}$ state, the $1^{st}$ state, and the $2^{nd}$ state of the speech-unit sil, the basic component of acoustic model M10, the basic component of acoustic model M11, and the basic component of acoustic model M12 corresponding to the $0^{th}$ state, the $1^{st}$ state, and the $2^{nd}$ state of the speech-unit P6, the basic component of acoustic model M91, the basic component of acoustic model M92, and the basic component of acoustic model M93 corresponding to the $0^{th}$ state, the $1^{st}$ state, and the $2^{nd}$ state of the speech-unit P31, and the basic component of acoustic model corresponding to each state of other speech-units and the speech signal 40, so as to obtain the optimal segments of the speech signal 40 corresponding to the basic components of acoustic models, thereby obtaining a segment result 601 of each basic component of acoustic model corresponding to the speech segment of the speech signal 40. Each speech segment corresponds to the basic component of acoustic model corresponding to a state of a speech-unit.

Then, referring to FIGS. 4A and 4B again, after the "state segmentation module" 136b generates the segmentation result 601, the "component selection module" 136c may compare each speech segment in the segmentation result 601 with the basic components of acoustic models 200 in the "speech recognition model" 134.

Figure 7:
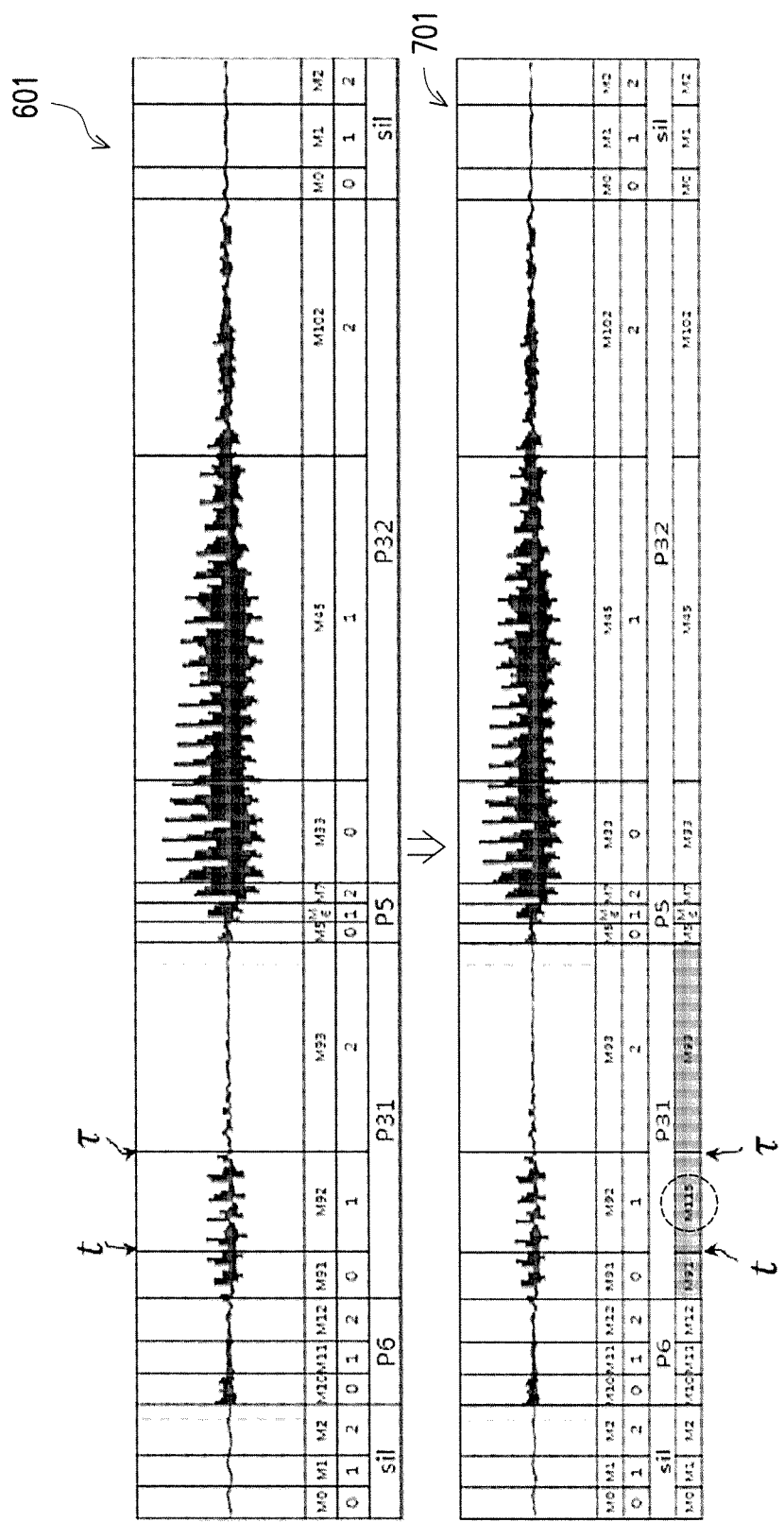
FIG. 7 is a schematic view illustrating selecting an optimal component according to an exemplary embodiment.

FIG. 7 is a schematic view illustrating selecting an optimal component according to an exemplary embodiment.

Referring to FIG. 7, following the example of FIG. 6, the speech segment (also referred to as "first speech segment") whose time interval is between a time t and a time τ is used as an example here. The first speech segment corresponds to the $1^{st}$ state (also referred to as "first state") of the speech-unit P31 (also referred to as "first speech-unit"), and the $1^{st}$ state of the speech-unit P31 corresponds to the basic component of acoustic model M92 (also referred to as "first basic component of acoustic model"). The "component selection module" 136c makes comparison based on the feature-vectors of the first speech segment and the "speech recognition model" 134, so as to look for whether there is a basic component of acoustic model having a higher degree of matching than that of the basic component of acoustic model M92 in the "speech recognition model" 134, and select the optimal component in the "speech recognition model" 134.

In particular, the "component selection module" 136c may look for an optimal component m* corresponding to the feature-vectors of first speech segment based on Formula (1) in the following:

$$m^* = \arg\max_{i=0...N-1} P\{m_i, o_t o_{t+1} ... o_\tau | \lambda\}, \quad (1)$$

$$0 ... N-1 \text{ for } N \text{ state models}$$

In Formula (1) o is a sequence of observation, namely the feature-vectors, $\lambda$ is the "speech recognition model" 134, $m_i$ is the basic component of acoustic model of the "speech recognition model" 134, and N is the number of all the basic components of acoustic models in the "speech recognition model" 134. In the method, the optimal component is selected from the basic components of acoustic models in the "speech recognition model" 134. Therefore, the basic components of acoustic models in the "speech recognition model" 134 are not changed, and N in Formula (1) remains constant.

In the exemplary embodiment of FIG. 7, the "component selection module" 136c may compare the speech segments based on the segmentation result 601 with the basic components of acoustic models of the "speech recognition model" 134. Taking the speech-unit P31 as an example, in the segmentation result 601, the $1^{st}$ state of the speech-unit P31 corresponds to the basic component of acoustic model M92. A starting time of the speech segment (i.e., the first speech segment) corresponding to the $1^{st}$ state of the speech-unit P31 is the time t, whereas an end time of the speech segment corresponding to the $1^{st}$ state of the speech-unit P31 is the time $\tau$. Through Formula (1), the "component selection module" 136c may compare the first speech segment with the basic components of acoustic models in the "speech recognition model" 134. The "component selection module" 136c may look for the optimal component having the highest similarity or degree of matching with respect to the first speech segment from the "speech recognition model" 134. In the exemplary embodiment, it is assumed that the degree of matching between the first speech segment and the basic component of acoustic model M115 (also referred to as "second basic component of acoustic model") is higher than the degree of matching between the first speech segment and the basic component of acoustic model M92. In such case, the "component selection module" 136c may select the basic component of acoustic model M115 to be the optimal component of the first speech segment, as shown in a comparison result 701 in FIG. 7.

Referring to FIGS. 4A and 4B again, when the "component selection module" 136c finishes executing the comparison, the "unit expansion module" 136d may determine whether the speech-unit is a native speech-unit or a new speech-unit, and may execute different operations based on the determined result.

Figure 8A:
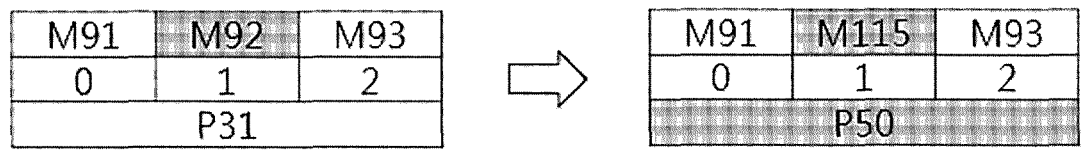
FIG. 8A is a schematic view illustrating adding a speech-unit to a speech recognition model according to an exemplary embodiment.

FIG. 8A is a schematic view illustrating adding a speech-unit to a speech recognition model according to an exemplary embodiment.

Referring to FIG. 8A, following FIG. 7, when the "component selection module" 136c selects the basic component of acoustic model M115 to be the optimal component of the first speech segment, the "unit expansion module" 136d may determine whether the speech-unit P31 corresponding to the first speech segment is a native speech-unit or a new speech-unit.

When the speech-unit P31 is a native speech-unit, the "unit expansion module" 136d may add a speech-unit P50 (also referred to as "second speech-unit") to the speech-units of the "speech recognition model" 134. In addition, the $0^{th}$ state and the $2^{nd}$ state of the speech-unit P50 may respectively correspond to the basic component of acoustic model M91 and the basic component of acoustic model M93 corresponding to the $0^{th}$ state and the $2^{nd}$ state of the speech-unit P31. The $1^{st}$ state of the speech-unit P50 corresponds to the optimal component that is selected (i.e., the basic component of acoustic model M115). Particularly, the $1^{st}$ state of the speech-unit P50 may be referred to as "second state", and the $0^{th}$ state and the $2^{nd}$ state of the speech-unit P50 may be referred to as "third state". The $0^{th}$ state and the $2^{nd}$ state of the speech-unit P31 may be referred to as "fourth state". The basic component of acoustic model M91 and the basic component of acoustic model M93 may be referred to as "third basic component of acoustic model". In addition, the newly added speech-unit P50 is categorized as a new speech-unit.

However, assuming the speech-unit P31 is a previously added new speech-unit, the "unit expansion module" 136d may update the speech-unit P31 based on the selected optimal component, such that a state of the speech-unit P31 is updated to correspond to the selected optimal component. Embodiments with respect to updating the new speech-unit based on the optimal component will be described in detail in the following.

Referring to FIGS. 4A and 4B again, in the speech recognition system 1000, after the "unit expansion module" 136d adds the speech-unit P50 to the "speech recognition model" 134, the "iteration control module" 136e may generate a new speech-unit sequence [P6 P50 P5 P32] for the speech signal 40 based on the updated speech-units of the "speech recognition model" 134. It should be noted that, differing from the original speech-unit sequence [P6 P31 P5 P32] generated by the "unit-sequence generation module" 136a, the speech-unit P31 is already replaced by the speech-unit P50. Then, the "state segmentation module" 136b, the "component selection module" 136c, and the "unit expansion module" 136d may perform an iterative operation based on the newly generated speech-unit sequence [P6 P50 P5 P32]. Here, the iterative operation may include, for example, having the "state segmentation module" 136b, the "component selection module" 136c, and the "unit expansion module" 136d repetitively execute the respective operations of the "state segmentation module" 136b, the "component selection module" 136c, and the "unit expansion module" 136d, so as to add a new speech-unit to the "speech recognition model" 134 or update the speech-units in the "speech recognition model" 134, thereby obtaining an optimal result.

Specifically, in the iterative operation, the speech recognition system 1000 may segment the speech signal 40 into a plurality of speech segments based on the respective states of the speech-unit sequence [P6 P50 P5 P32] by using the "state segmentation module" 136b. Then, by using the "component selection module" 136c, the optimal basic component model is again chosen for each speech segment based on the segmentation result. Here, the basic components of acoustic models in the speech-units of the speech-unit sequence [P6 P50 P5 P32] may be further modified.

Figure 8B:
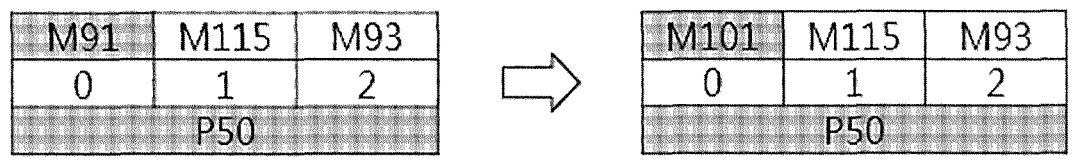
FIG. 8B is a schematic view illustrating updating a new speech-unit in a "speech recognition model" according to an exemplary embodiment.

FIG. 8B is a schematic view illustrating updating a new speech-unit in a "speech recognition model" according to an exemplary embodiment.

Referring to FIG. 8B, taking the speech-unit P50 as an example, the $0^{th}$ state of the speech-unit P50 corresponds to the basic component of acoustic model M91. It is assumed that in the iterative operation, after the "component selection module" 136c finish executing the comparison, the optimal component corresponding to the $0^{th}$ state of the speech-unit P50 is the basic component of acoustic model M101. Here, since the speech-unit P50 is a new speech-unit, the "unit expansion module" 136d may update the speech-unit P50 based on the selected optimal component, so that the $0^{th}$ state of the speech-unit corresponds to the selected optimal component (i.e., the basic component of acoustic model M101).

In addition, assuming the basic component of acoustic model of one of the speech-unit P6, the speech-unit P5, and the speech-unit P32 in the speech-unit sequence [P6 P50 P5 P32] is modified, since the speech-unit P6, the speech-unit P5, and the speech-unit P32 are all native speech-units, the "unit expansion module" 136d needs to add a new speech-unit to the "speech recognition model" 134 again.

Then, referring to FIGS. 4A and 4B again, it is assumed that, through the iterative operation, the basic components of acoustic models of the speech-units in the speech-unit sequence [P6 P50 P5 P32] are no longer modified. At this time, the speech recognition system 1000 may execute the "quality check module" 136f.

Figure 9:
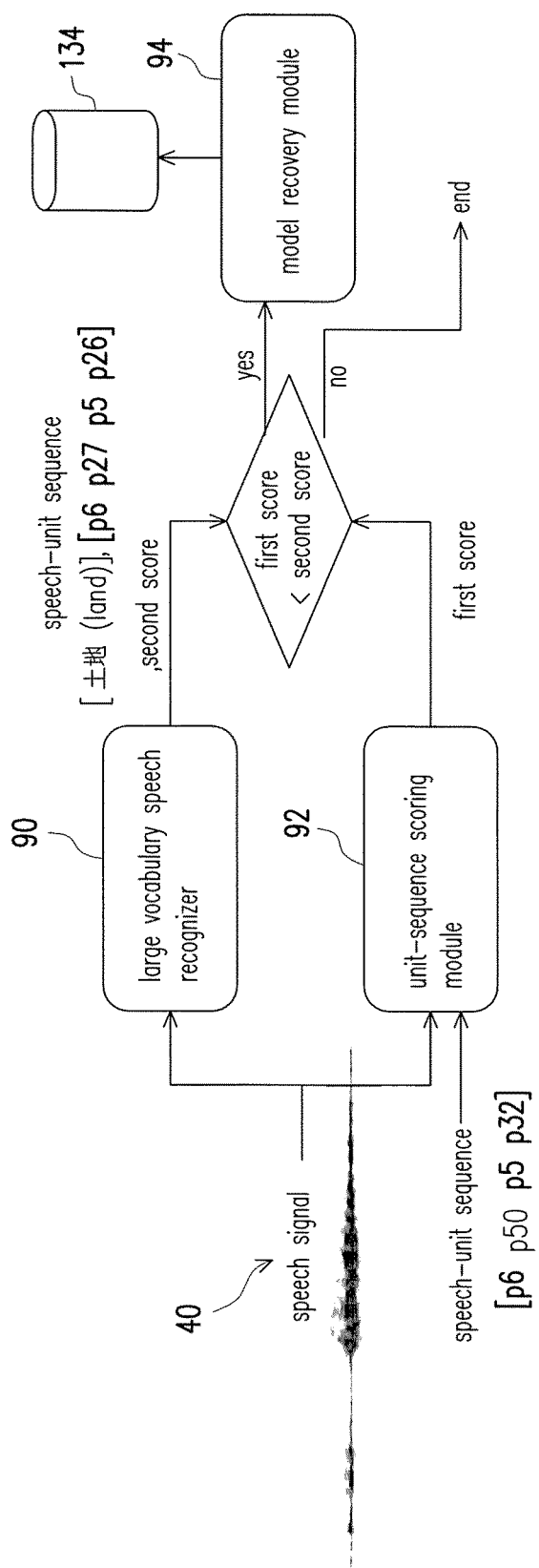
FIG. 9 is a schematic view illustrating operation of the "quality check module" according to an exemplary embodiment.

FIG. 9 is a schematic view illustrating operation of the "quality check module" according to an exemplary embodiment.

Referring to FIG. 9, the "quality check module" 136f includes a "large vocabulary speech recognizer" 90, a "unit-sequence scoring module" 92, and a "model recovery module" 94.

The "large vocabulary speech recognizer" 90 has a large number of words, such as 200 thousand words. When the speech signal 40 is input into the "large vocabulary speech recognizer" 90, the "large vocabulary speech recognizer" 90 may output a word (e.g., "土地", meaning "land" in Chinese, a similar pronunciation like "today") corresponding to a best recognition result of the speech signal 40, the corresponding speech-unit sequence (also referred to as "third speech-unit sequence", which is assumed here as "[P6 P27 P5 P26]"), and a corresponding score (also referred to as "second score"). The second score represents the best score obtained by recognizing the speech signal 40 based on the words available in the "large vocabulary speech recognizer" 90. The "unit-sequence scoring module" 92 serves to calculate a score (also referred to as "first score") corresponding to the speech signal 40 based on the speech-unit sequence [P6 P50 P5 P32] and the speech signal 40. The first score represents a score obtained through calculating the speech signal 40 using the speech-unit sequence [P6 P50 P5 P32]. The first score being lower than the second score indicates that it is inappropriate to represent the speech signal 40 with the speech-unit sequence [P6 P50 P5 P32], and also indicates that the newly generated speech-unit P50 may have an undesirable quality. The "model recovery module" 94 of the "quality check module" 136f may delete the speech-unit P50 from the "speech recognition model" 134. Accordingly, the process returns to the "unit-sequence generation module" 136a. The "unit-sequence generation module" 136a may firstly determine whether there is any other speech-unit sequence corresponding to the word 41 available in the "vocabulary lists" 136i. If there is no other speech-unit sequence corresponding to the word 41 available in the "vocabulary lists" 136i, one of the speech-unit sequences that are not yet used in other speech-unit sequences generated through conversion based on the phonetic symbol 42 (or other speech-unit sequences generated by recognizing the speech signal 40 through the "speech-unit recognizer" 510) is selected. Then, the operations of the "state segmentation module" 136b, the "component selection module" 136c, the "unit expansion module" 136d, the "iteration control module" 136e, and the "quality check module" 136f are executed again.

If there is no other speech-unit sequence available in the "unit-sequence generation module" 136a, or other speech-unit sequences generated are all used already, the third speech-unit sequence [P6 P27 P5 P26] corresponding to the best recognition result of the speech signal 40 and output by the "large vocabulary speech recognizer" 90 is the optimal representation of the speech signal 40. In other words, the third speech-unit sequence [P6 P27 P5 P26] may serve as the representation of the speech signal 40. Then, the "vocabulary update module" 136h may store the third speech-unit sequence [P6 P27 P5 P26] corresponding to the word 41 of "today" to the "vocabulary lists" 136i and completes the process in FIGS. 4A and 4B.

However, the first score being higher than the second score indicates that, in the case of the speech signal 40, the speech-unit sequence [P6 P50 P5 P32] may score higher than the result recognized by the "large vocabulary recognizer" 90 does, and indicates that representing "today" with the speech-unit sequence [P6 P50 P5 P32] does not result in confusion among the words of the "large vocabulary speech recognizer" 90. Therefore, the operation of the "quality check module" 136f may be completed.

After the operation of the "quality check module" 136f, referring to FIGS. 4A and 4B again, if the first score is higher than the second score, the speech recognition system 1000 executes the "composition update module" 136g. Specifically, the analysis procedure generates the new speech-unit P50 based on the speech signal 40. However, the speech recognition system 1000 may further collect a plurality of speech signals relating to the word 41 of "today" that are recorded by the same or different people, and perform the analysis. Thus, after recognizing the speech signals relating to the word 41 of "today" recorded by the same or different people, the speech-units P50 may be respectively added to the "speech recognition model" 134. At the stage, by using the "composition update module" 136g, the speech-units P50 may be normalized to generate a normalized speech-unit P50.

Figure 10:
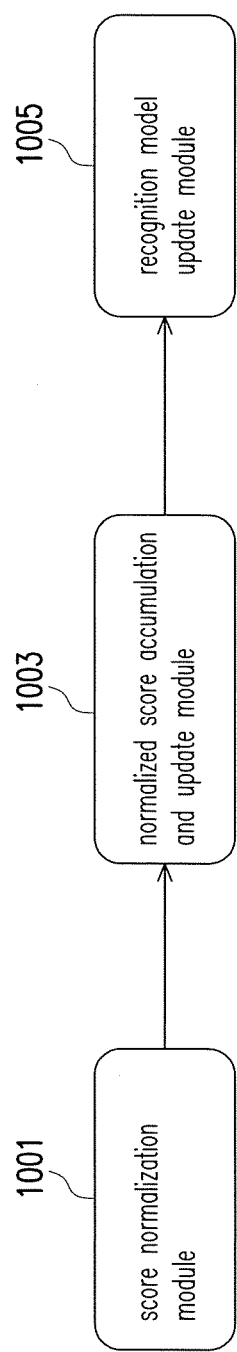
FIG. 10 is a schematic view illustrating operation of the "composition update module" according to an exemplary embodiment.

FIG. 10 is a schematic view illustrating operation of the "composition update module" according to an exemplary embodiment.

Referring to FIG. 10, the "composition update module" 136g includes a "score normalization module" 1001, a "normalized score accumulation and update module" 1003, and a "recognition model update module" 1005.

Specifically, for each speech-unit P50, the "score normalization module" 1001 of the "composition update module" 136g may calculate a normalization score of the basic component corresponding to each state of the speech-unit 50 based on the basic component of acoustic model corresponding to each state of the speech-unit P50.

Taking the speech-unit P50 on the right side in FIG. 8A as an example, the "score normalization module" 1001 may calculate the normalization scores of a plurality of first basic component corresponding to the $1^{st}$ state of the speech-unit P50 based on a ranking result of the basic components of acoustic models (also referred to as "the ranking result of the first basic component of acoustic model") corresponding to the 1$^{st}$ state of the speech-unit P50. The "ranking result of basic component of acoustic model" represents a ranking of the degrees of matching between the basic components of acoustic models of the "speech recognition model" 134 and the speech segment of the 1$^{st}$ state of the speech-unit P50 during comparison of the "component selection module" 136c. For example, the basic component of acoustic model having the highest degree of matching with respect to the speech segment of the 1$^{st}$ state of the speech-unit P50 is ranked first in the ranking result of the basic component of acoustic model. The basic component of acoustic model having the second highest degree of matching with respect to the speech segment of the 1$^{st}$ state of the speech-unit P50 is ranked second in the ranking result of the basic component of acoustic model. The basic component of acoustic model having the third highest degree of matching with respect to the speech segment of the 1$^{st}$ state of the speech-unit P50 is ranked third in the ranking result of the basic component of acoustic model. The rest of the basic components of acoustic models are ranked based on the same principle.

In particular, the basic component of acoustic model ranked first in the ranking result of the basic component of acoustic model is assigned a normalization score "N/N". N represents the number of the basic components of acoustic models in the "speech recognition model" 134. In other words, the value of the normalization score of the basic component of acoustic model ranked first in the ranking result of the basic component of acoustic model is "1".

In addition, the basic component of acoustic model ranked second in the ranking result of the basic component of acoustic model is assigned a normalization score "(N−1)/N". The basic component of acoustic model ranked third in the ranking result of the basic component of acoustic model is assigned a normalization score "(N−2)/N". The rest of the basic components of acoustic models are assigned scores based on the same principle. The basic component of acoustic model ranked last in the ranking result of the basic component of acoustic model is assigned a normalization score "1/N".

Similarly, the "score normalization module" 1001 may calculate a plurality of normalization scores corresponding to the 0$^{th}$ state of the speech-unit P50 based on a ranking result of a basic component of acoustic model of the 0$^{th}$ state of the speech-unit P50, and the "score normalization module" 1001 may also calculate a plurality of normalization scores corresponding to the 2$^{nd}$ state of the speech-unit based on a ranking result of a basic component of acoustic model of the 2$^{nd}$ state of the speech-unit P50. In addition, calculation of the normalization scores corresponding to the 0$^{th}$ state and the 2$^{nd}$ state of the speech-unit P50 based on the ranking results of the basic components of acoustic models may follow the calculation of the normalization scores of the first basic component corresponding to the 1$^{st}$ state of the speech-unit P50. Therefore, details in this regard will not be repeated in the following. Particularly, the basic component normalization scores corresponding to the 0$^{th}$ state of the speech-unit P50 and the basic component normalization scores corresponding to the 2$^{nd}$ state of the speech-unit P50 may be generally referred to as "the normalization scores of second basic components".

Then, the "composition update module" 136g further updates a corresponding relationship between the second state and the basic components of acoustic models based on the normalization scores of the first basic components, and updates a corresponding relationship between the third state and the basic components of acoustic models based on the normalization scores of the second basic components.

Specifically, after the operation of the "score normalization module" 1001, the "normalized score accumulation and update module" 1003 may generate a "basic component composition table".

FIG. 11 is a schematic view illustrating operation of the "basic component composition table" according to an exemplary embodiment.

Referring to FIG. 11, it is assumed that a sub-table 1101 in the "basic component composition table" 11111 records the ranking result of the basic components of acoustic models (from highest to lowest) of the 0$^{th}$ state of the speech-unit P50 generated based on a speech signal Utt-1 and the normalization scores corresponding to the respective basic components of acoustic models in the ranking result of the basic components of acoustic models. For example, the sub-table 1101 records that, in the 0$^{th}$ state of the speech-unit P50 generated based on the speech signal Utt-1, the basic component of acoustic model having the highest degree of matching with respect to the state is the basic component of acoustic model M101, and the value of the normalization score of the basic component of acoustic model M101 is 1. In addition, the sub-table 1101 also records that, in the 0$^{th}$ state of the speech-unit P50 generated based on the speech signal Utt-1, the basic component of acoustic model having the second highest degree of matching with respect to the state is the basic component of acoustic model M90, and the value of the normalization score of the basic component of acoustic model M90 is 0.9935. And the rest may be obtained based on the same principle.

Similarly, a sub-table 1103 records the ranking result of the basic components of acoustic models of the 1$^{st}$ state of the speech-unit P50 generated from the speech signal Utt-1 and the normalization scores corresponding to the respective basic components of acoustic models in the ranking result of the basic components of acoustic models. A sub-table 1104 records the ranking result of the basic components of acoustic models of the 2$^{nd}$ state of the speech-unit P50 generated from the speech signal Utt-1 and the normalization scores corresponding to the respective basic components of acoustic models in the ranking result of the basic components of acoustic models.

In addition, the "score normalization module" 1001 may also generate the ranking result of the basic components of acoustic models of the 0$^{th}$ state of the speech-unit P50 and the normalization scores corresponding to the respective basic components of acoustic models based on a speech signal Utt-2. The "normalized score accumulation and update module" 1003 may calculate a new normalization score for each basic component of acoustic model, and re-order the ranking based on the new normalization scores, so as to generate a new ranking result of the basic components of acoustic models. In addition, the new normalization score is generated by adding the normalization score of the basic component of acoustic model generated based on the speech signal Utt-1 and the normalization score of the basic component of acoustic model generated based on the speech signal Utt-2.

For example, it is assumed that in the 0$^{th}$ state of the speech signal Utt-1, the value of the nointalization score of the basic component of acoustic model M101 is 1, and in the 0$^{th}$ state of the speech signal Utt-2, the value of the normalization score of the basic component of acoustic model M101 is 0.9804, the value of the new normalization score of the basic component of acoustic model M101 is recorded as 1.9804. Similarly, assuming that in the 0$^{th}$ state of the speech signal Utt-1, the value of the normalization score of the basic component of acoustic model M90 is 0.9935, and in the $0^{th}$ state of the speech signal Utt-2, the value of the normalization score of the basic component of acoustic model M90 is 1, the value of the new normalization score of the basic component of acoustic model M90 is recorded as 1.9935. And the rest may be obtained based on the same principle.

After the new normalization scores of the respective basic components of acoustic models are calculated according to the calculation, the "normalized score accumulation and update module" 1003 may rank the new normalization scores and record the ranking result in a sub-table 1102. It can be seen that the basic component of acoustic model M90 in the sub-table 1102 is the basic component of acoustic model having the highest degree of matching with respect to the $0^{th}$ state of the speech-unit P50.

In addition, the "normalized score accumulation and update module" 1003 may repeat the operation based on a speech signal Utt-3, a speech signal Utt-4, and a speech signal Utt-5. After the operation, in a sub-table 1105, the basic component of acoustic model eventually having the highest degree of matching with respect to the $0^{th}$ state of the speech-unit P50 after normalization is the basic component of acoustic model M101.

In addition, the operation may also be repetitively performed for the $1^{st}$ state of the speech-unit P50 and the $2^{nd}$ state of the speech-unit P50 based on the speech signal Utt-2, the speech signal Utt-3, the speech signal Utt-4, and the speech signal Utt-5. After the operation, in a sub-table 1106, the basic component of acoustic model eventually having the highest degree of matching with respect to the $1^{st}$ state of the speech-unit P50 after normalization is the basic component of acoustic model M41. In a sub-table 1107, the basic component of acoustic model having the highest degree of matching with respect to the $2^{nd}$ state of the speech-unit P50 after normalization is the basic component of acoustic model M93.

Figure 12:
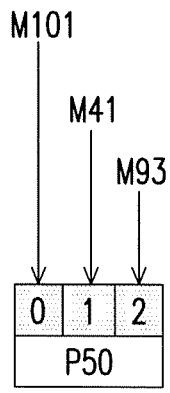
FIG. 12 is a schematic view illustrating operation of the "recognition model update module" according to an exemplary embodiment.

FIG. 12 is a schematic view illustrating operation of the "recognition model update module" according to an exemplary embodiment.

Referring to FIG. 12, the "recognition model update module" 1005 may follow the normalization result of the "normalized score accumulation and update module" 1003 to make the $0^{th}$ state of the speech-unit P50 correspond to the basic component of acoustic model M101, the $1^{st}$ state of the speech-unit P50 correspond to the basic component of acoustic model M41, and the $2^{nd}$ state of the speech-unit P50 correspond to the basic component of acoustic model M93. Then, the "recognition model update module" 1005 may store the corresponding relationships of the respective states of the speech-unit P50 after normalization to the "speech recognition model" 134. Then, the "vocabulary update module" 136h may store the speech-unit sequence corresponding to the word 41 of "today" to the "vocabulary lists" 136i. Then, the operations of the respective modules in FIGS. 4A and 4B are completed.

Specifically, since the speech signals 40 with respect to the word 41 of "today" recorded by the same or different people may vary in accent and pronunciation and may generate different speech-unit sequences, through the above operation, the "vocabulary update module" 136h may further store the different speech-unit sequences in the "vocabulary lists" 136i. In other words, the same word may correspond to different speech-unit sequences, i.e., multi-pronunciation.

After adding the non-native word, a speech-unit sequence of a foreign word may be defined, and a new speech-unit as required may be constructed. Therefore, in addition to recognizing native words, the speech recognition system 1000 may further serve to recognize a new foreign word.

Figure 13:
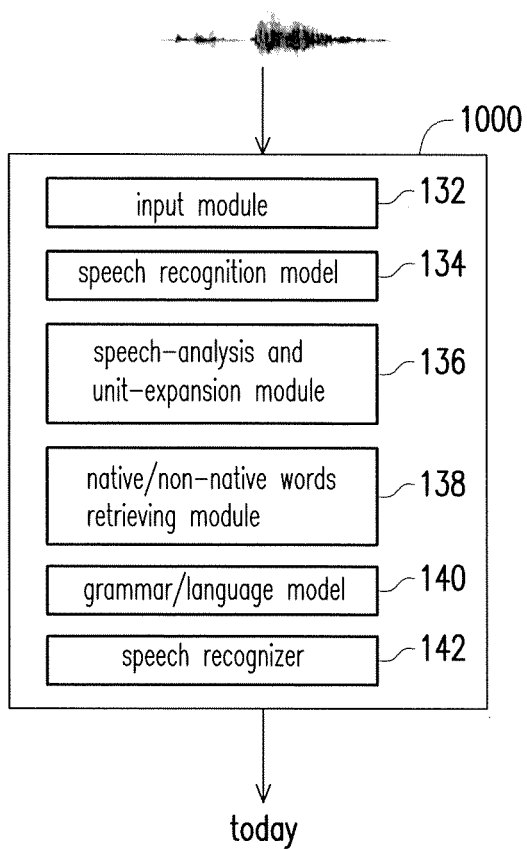
FIG. 13 is a schematic view illustrating operation of speech recognition according to an exemplary embodiment.

FIG. 13 is a schematic view illustrating operation of speech recognition according to an exemplary embodiment.

Referring to FIG. 13, in FIG. 13, the "speech-analysis and unit-expansion module" 136 in the speech recognition system 1000 may execute the operations of the respective modules in FIGS. 4A and 4B. After the operations of the respective modules in FIGS. 4A and 4B, a new speech-unit required to describe a foreign word or a non-native word may be added to the "speech recognition model" 134 of the speech recognition system 1000, and during the addition, the non-native word may be added to the "vocabulary lists" 136i of the "speech-analysis and unit-expansion module" 136. Accordingly, a non-native speech-unit sequence may serve to recognize a non-native word.

In particular, the "native/non-native words retrieving module" 138 may output the speech-unit sequence corresponding to the given native/non-native word from the "vocabulary lists" 136i. In addition, the "speech recognizer" 142 in the speech recognition system 1000 may perform speech recognition by integrating the "native/non-native words retrieving module" 138 and the "speech recognition model" 134. In other words, the speech recognition system 1000 may receive a speech signal (also referred to as "first speech signal") to perform speech recognition. For example, the "speech recognizer" 142 may obtain the speech-unit sequences of the native/non-native words from the "vocabulary lists" 136i through the "native/non-native words retrieving module" 138. Then, the "speech recognizer" 142 may combine the "speech recognition model" 134 and the speech-unit sequences of the native/non-native words obtained from the "vocabulary lists" 136i to construct a search-networks for recognition. Then, speech recognition is performed and a corresponding recognition result is output. In another embodiment, the "speech recognizer" 142 may further combine the "grammar/language model" 140, the "speech recognition model" 134, and the speech-unit sequences of the native/non-native words obtained from the "vocabulary lists" 136i to construct the search-networks for recognition. More detailed implementing particulars as to how the search-networks construction by using the speech-unit sequences, the "grammar/language model" 140, and the "speech recognition model" 134 therefore to perform speech recognition can be learned from the conventional technology, and thus are not repeated here.

Figure 14:
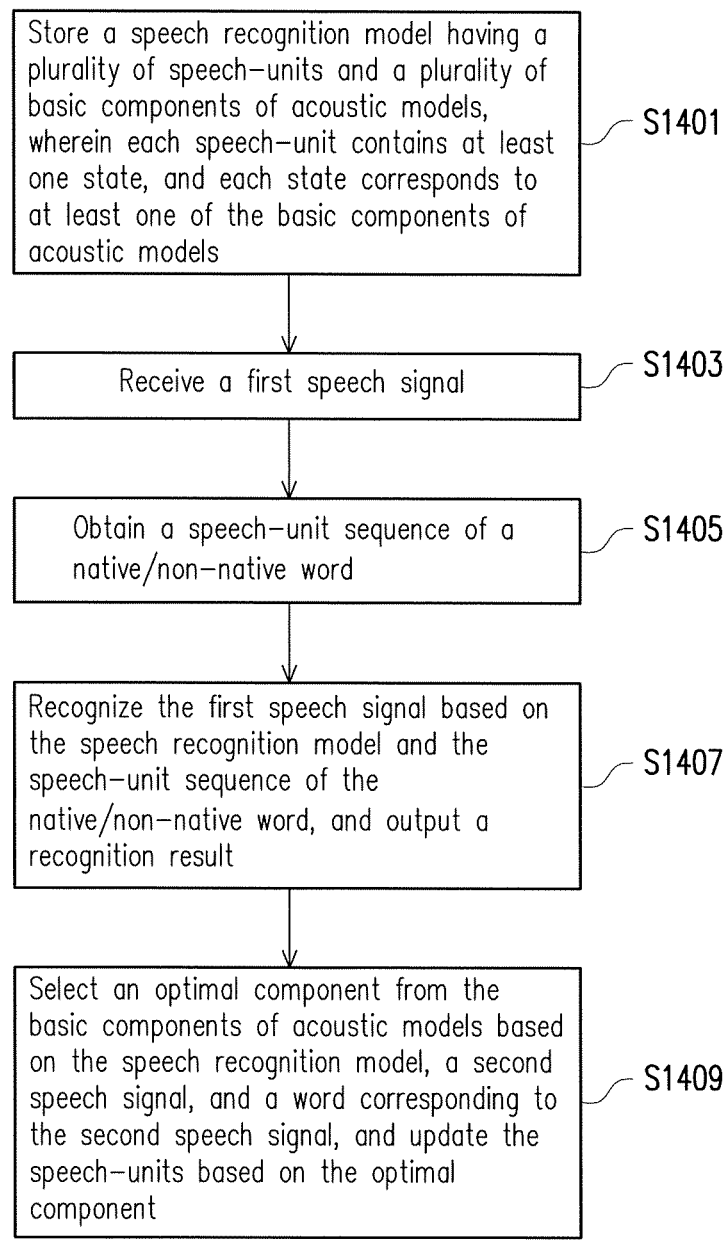
FIG. 14 is a flowchart illustrating a speech recognition method according to an exemplary embodiment.

FIG. 14 is a flowchart illustrating a speech recognition method according to an exemplary embodiment.

Referring to FIG. 14, at Step S1401, the storage unit 130 stores the "speech recognition model". The "speech recognition model" has the speech-units and the basic components of acoustic models. In addition, each speech-unit has at least one state, and each state corresponds to at least one of the basic components of acoustic models. At Step S1403, the first speech signal is received by the "input module" 132. At Step S1405, the "native/non-native words retrieving module" 138 obtains the speech-unit sequence of the native/non-native word from the "speech-analysis and unit-expansion module" 136. At Step S1407, the "speech recognizer" 142 recognizes the first speech signal based on the "speech recognition model" 134 and the speech-unit sequence of the native/non-native word, and outputs the recognition result. At Step S1409, the "speech-analysis and unit-expansion module" 136 selects the optimal component based on the "speech recognition model" 134, the second speech signal received by the "input module" 132, and a word received by the "input module" 132 corresponding to the second speech signal, and updates the speech-units based on the optimal component. It should be noted that FIG. 14 does not impose a limitation on an order of carrying out Step S1403, Step S1405, Step S1407, and Step S1409. In an exemplary embodiment, Step S1409 may also be carried out firstly, followed by Step S1403, S1405, and S1407.

Figure 15:
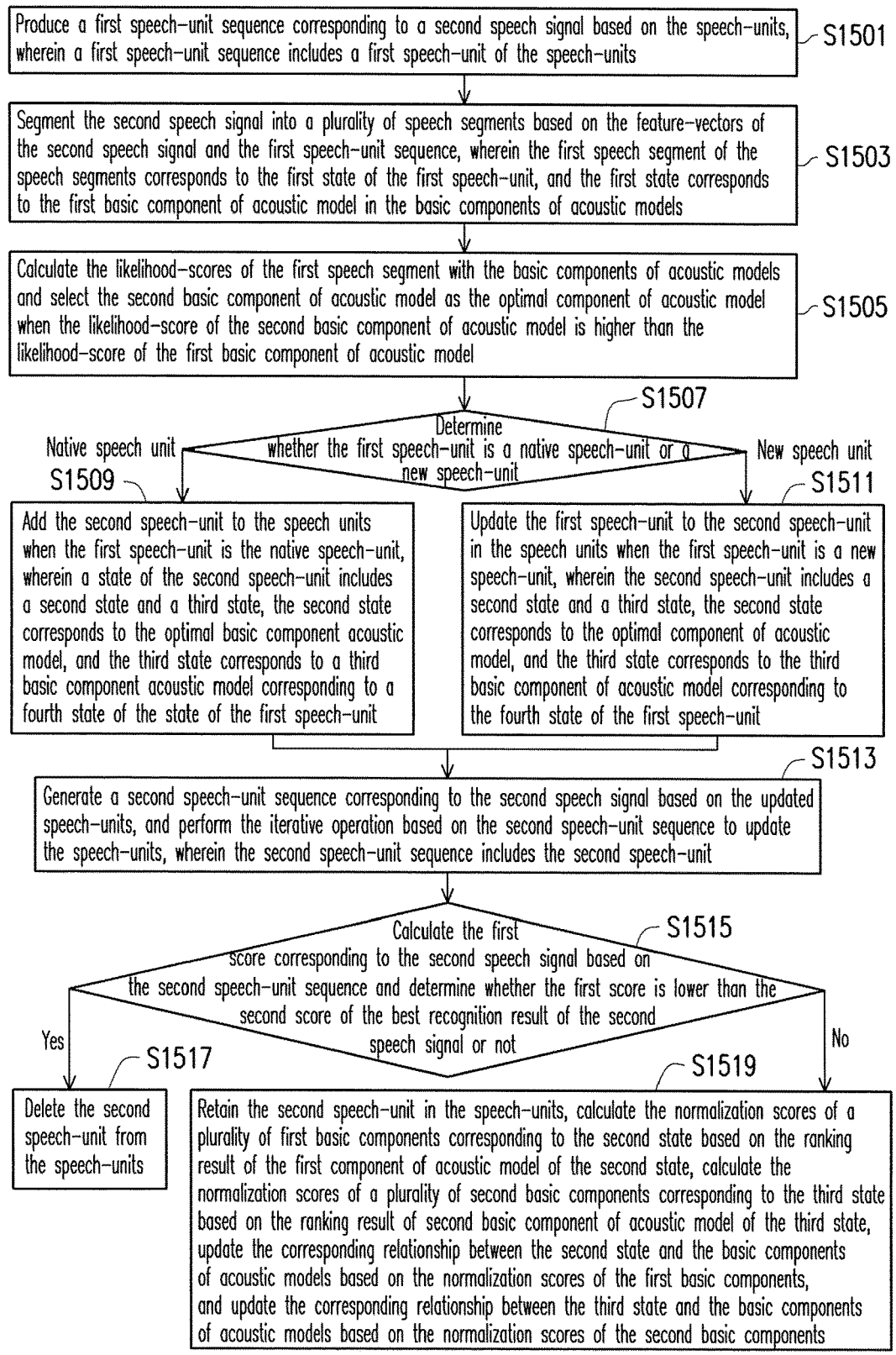
FIG. 15 is a flowchart illustrating a method applicable to the "speech-analysis and unit-expansion module" according to an exemplary embodiment.

FIG. 15 is a flowchart illustrating a method applicable to the "speech-analysis and unit-expansion module" according to an exemplary embodiment. Specifically, more detailed implementing particulars of Step S1409 of FIG. 14 are described with reference to FIG. 15.

Referring to FIG. 15, at Step S1501, the "unit-sequence generation module" 136a may generate the first speech-unit sequence corresponding to the input second speech signal based on the speech-units of the "speech recognition model". The first speech-unit sequence includes the first speech-unit in the speech-units. Then, at Step S1503, the "state segmentation module" 136b may segment the second speech signal into the speech segments based on the feature-vectors of the second speech signal and the first speech-unit sequence. In addition, the first speech segment in the speech segments corresponds to the first state of the first speech-unit, and the first state corresponds to the first basic component of acoustic model of the basic components of acoustic models. Then, at Step S1505, the "component selection module" 136c serves to calculate the likelihood-scores of the first speech segment with the basic components of acoustic models. When the likelihood-score of the second basic component of acoustic model in the basic components of acoustic models is higher than the likelihood-score of the first basic component of acoustic model, the second basic component of acoustic model is selected as the optimal component. At Step S1507, the "unit expansion module" 136d determines whether the first speech-unit is the native speech-unit or the new speech-unit.

When the first speech-unit is the native speech-unit, at Step S1509, the "unit expansion module" 136d may add the second speech-unit to the speech-units. The states of the second speech-unit include the second state and the third state. The second state corresponds to the optimal component, and the third state corresponds to the third basic component of acoustic model corresponding to the fourth state of the states of the first speech-unit.

When the first speech-unit is the new speech-unit, at Step S1511, the "unit expansion module" 136d further serves to update the first speech-unit to the second speech-unit in the speech-units. The states of the second speech-unit include the second state and the third state. The second state corresponds to the optimal component, and the third state corresponds to the third basic component of acoustic model corresponding to the fourth state of the states of the first speech-unit.

Then, at Step S1513, the "iteration control module" 136e generates the second speech-unit sequence corresponding to the second speech signal based on the updated speech-units. The second speech-unit sequence includes the second speech-unit. The "state segmentation module" 136b, the "component selection module" 136c, and the "unit expansion module" 136d perform the iterative operation based on the second speech-unit sequence to update the speech-units.

Then, at Step S1515, the "quality check module" 136f calculates the first score corresponding to the second speech signal based on the second speech-unit sequence, and determines whether the first score is lower than the second score of the best recognition result of the second speech signal.

When the first score is lower than the second score, at Step S1517, the "quality check module" 136f deletes the second speech-unit in the speech-units.

When the first score is not lower than the second score, at Step S1519, the "quality check module" 136f retains the second speech-unit in the speech-units. In addition, the "composition update module" 136g calculates the normalization scores of the first basic components of acoustic models corresponding to the second state based on the ranking result of the first basic component of acoustic model corresponding to the second state of the second speech-unit and calculate the normalization scores of the second basic components of acoustic models corresponding to the third state based on the ranking result of the second basic component of acoustic model corresponding to the third state of the second speech-unit. The "composition update module" 136g updates the corresponding relationship between the second state of the second speech-unit and the basic components of acoustic models based on the normalization scores of the first basic components of acoustic models, and updates the corresponding relationship between the third state of the second speech-unit and the basic components of acoustic models based on the normalization scores of the second basic components of acoustic models.

In view of the foregoing, the speech recognition system, the speech recognition method, and the computer program product of the disclosure are capable of recognizing the non-native word without recording a large number of materials in a non-native language and retraining the acoustic model. Particularly, when adding the speech-unit into the speech recognition model for recognizing the non-native word speech, the recognition performance for the speech in native language will not be affected by the model update.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:
1. A speech recognition system, comprising:
   a storage device, storing a speech recognition model having a plurality of speech-units and a plurality of basic components of acoustic models, wherein each of the speech-units has at least one state, and each of the at least one state corresponds to at least one of the basic components of acoustic models;
   a processor, wherein the processor is configured to:
      receive a first speech signal;
      obtain a speech-unit sequence of a native/non-native word; and
      recognize the first speech signal based on the speech recognition model and the speech-unit sequence of the native/non-native word and output a recognition result,
      wherein the processor is further configured to select an optimal component from the basic components of acoustic models based on the speech recognition model, a second speech signal received by the processor, and a word received by the processor corresponding to the second speech signal, and updates the speech-units based on the optimal component,
   wherein in the operation of updating the speech-units based on the optimal basic component speech model, the processor is further configured to determine whether a first speech-unit among the speech-units is a native speech-unit or a new speech-unit, when the first speech-unit is the native speech-unit, the processor adds a second speech-unit to the speech-units, wherein the state of the second speech-unit comprises a second state and a third state, the second state corresponds to the optimal component, and the third state corresponds to a third basic component of acoustic model corresponding to a fourth state of the first speech-unit, when the first speech-unit is the new speech-unit, the processor updates the first speech-unit to the second speech-unit of the speech-units, wherein the state of the second speech-unit comprises the second state and the third state, the second state corresponds to the optimal component, and the third state corresponds to the third basic component of acoustic model corresponding to the fourth state of the first speech-unit.

2. The speech recognition system as claimed in claim 1, wherein before the operation of selecting the optimal component from the basic components of acoustic models based on the speech recognition model, the second speech signal received by the processor, and the word received by the processor corresponding to the second speech signal, the processor generates a first speech-unit sequence corresponding to the second speech signal based on the speech-units, wherein the first speech-unit sequence comprises the first speech-unit among the speech-units.

3. The speech recognition system as claimed in claim 2, wherein after the operation of generating the first speech-unit sequence corresponding to the second speech signal based on the speech-units and before the operation of selecting the optimal component from the basic components of acoustic models based on the speech recognition model, the second speech signal received by the processor, and the word received by the processor corresponding to the second speech signal, the processor segments the second speech signal into a plurality of speech segments based on a plurality of feature-vectors of the second speech signal and the first speech-unit sequence, wherein a first speech segment of the speech segments corresponds to a first state of the first speech-unit, and the first state corresponds to a first basic component of acoustic model in the basic components of acoustic models.

4. The speech recognition system as claimed in claim 3, wherein in the operation of selecting the optimal component from the basic components of acoustic models based on the speech recognition model, the second speech signal received by the processor, and the word received by the processor corresponding to the second speech signal, the processor compares the first speech segment with the basic components of acoustic models, when a degree of matching for the first speech segment with a second basic component of acoustic model of the basic components of acoustic models is higher than a degree of matching for the first speech segment with the first basic component of acoustic model, the processor further selects the second basic component of acoustic model as the optimal component.

5. The speech recognition system as claimed in claim 1, wherein before the operation of selecting the optimal component from the basic components of acoustic models based on the speech recognition model, the second speech signal received by the processor, and the word received by the processor corresponding to the second speech signal, the processor selects a first speech-unit sequence from a plurality of predetermined speech-unit sequences based on the second speech signal, wherein the first speech-unit sequence comprises the first speech-unit of the speech-units.

6. The speech recognition system as claimed in claim 1, wherein after the operation of updating the speech-units based on the optimal component, the processor generates a second speech-unit sequence corresponding to the second speech signal based on the updated speech-units, wherein the second speech-unit sequence comprises the second speech-unit, wherein the processor performs an iterative operation based on the second speech-unit sequence, so as to update the speech-units.

7. The speech recognition system as claimed in claim 6, wherein after the operation of updating the speech-units based on the optimal component, the processor calculates a first score corresponding to the second speech signal based on the second speech-unit sequence, and determine whether the first score is lower than a second score of a best recognition result of the second speech signal, when the first score is lower than the second score, the processor further deletes the second speech-unit of the speech-units, and when the first speech-unit is not lower than the second score, the processor further retains the second speech-unit of the speech-units.

8. The speech recognition system as claimed in claim 7, wherein after the operation of retaining the second speech-unit of the speech-units, the processor calculates a plurality of normalization scores of first basic components corresponding to the second state based on a ranking result of a first basic component of acoustic model corresponding to the second state, the processor further calculates a plurality of normalization scores of second basic components corresponding to the third state based on a ranking result of a second basic component of acoustic model corresponding to the third state, the processor further updates a corresponding relationship between the second state and the basic components of acoustic models based on the normalization scores of first basic components, and updates a corresponding relationship between the third state and the basic components of acoustic models based on the normalization scores of second basic components, and the processor further stores the word corresponding to the second speech signal and the second speech-unit sequence in a vocabulary lists.

9. The speech recognition system as claimed in claim 1, wherein the processor further receives a phonetic symbol corresponding to the second speech signal, and further selects the optimal component from the basic components of acoustic models based on the speech recognition model, the second speech signal, the word, and the phonetic symbol.

10. The speech recognition system as claimed in claim 9, wherein before the operation of selecting the optimal component from the basic components of acoustic models based on the speech recognition model, the second speech signal received by the processor, and the word received by the processor corresponding to the second speech signal, the processor generates a first speech-unit sequence corresponding to the second speech signal based on the phonetic symbol, wherein the first speech-unit sequence comprises the first speech-unit of the speech-units.

11. A speech recognition method, comprising:
storing a speech recognition model having a plurality of speech-units and a plurality of basic components of acoustic models, wherein each of the speech-units has at least one state, and each of the at least one state corresponds to at least one of the basic components of acoustic models;
receiving a first speech signal;
obtaining a speech-unit sequence of a native/non-native word;
recognizing the first speech signal based on the speech recognition model and the speech-unit sequence of the native/non-native word, and outputting a recognition result; and
receiving a second speech signal and a word corresponding to the second speech signal, and selecting an optimal component from the basic components of acoustic models based on the speech recognition model, the second speech signal, and the word corresponding to the second speech signal, and updating the speech-units based on the optimal component,
wherein the step of updating the speech-units based on the optimal component comprises:
determining whether a first speech-unit among the speech-units is a native speech-unit or a new speech-unit;
adding a second speech-unit to the speech-units when the first speech-unit is the native speech-unit, wherein the state of the second speech-unit comprises a second state and a third state, the second state corresponds to the optimal component, and the third state corresponds to a third basic component of acoustic model corresponding to a fourth state of the first speech-unit; and
updating the first speech-unit to the second speech-unit of the speech-units when the first speech-unit is the new speech-unit, wherein the state of the second speech-unit comprises the second state and the third state, the second state corresponds to the optimal component, and the third state corresponds to the third basic component of acoustic model corresponding to the fourth state of the first speech-unit.

12. The speech recognition method as claimed in claim 11, further comprising: before the step of selecting the optimal component from the basic components of acoustic models based on the speech recognition model, the second speech signal, and the word corresponding to the second speech signal, generating a first speech-unit sequence corresponding to the second speech signal based on the speech-units,
wherein the first speech-unit sequence comprises the first speech-unit of the speech-units.

13. The speech recognition method as claimed in claim 12, further comprising: after the operation of generating the first speech-unit sequence corresponding to the second speech signal based on the speech-units and before the step of selecting the optimal component from the basic components of acoustic models based on the speech recognition model, the second speech signal, and the word corresponding to the second speech signal, segmenting the second speech signal into a plurality of speech segments based on a plurality of feature-vectors of the second speech signal and the first speech-unit sequence,
wherein a first speech segment of the speech segments corresponds to a first state of the first speech-unit, and the first state corresponds to a first basic component of acoustic model in the basic components of acoustic models.

14. The speech recognition method as claimed in claim 13, wherein the step of selecting the optimal component from the basic components of acoustic models based on the speech recognition model, the second speech signal, and the word corresponding to the second speech signal comprises:
comparing the first speech segment with the basic components of acoustic models; and
selecting a second basic component of acoustic model as the optimal component when a degree of matching for the first speech segment with the second basic component of acoustic model in the basic components of acoustic models is higher than a degree of matching for the first speech segment with the first basic component of acoustic model.

15. The speech recognition method as claimed in claim 11, further comprising: before the step of selecting the optimal component from the basic components of acoustic models based on the speech recognition model, the second speech signal, and the word corresponding to the second speech signal, selecting a first speech-unit sequence from a plurality of predetermined speech-unit sequences based on the speech signal, wherein the first speech-unit sequence comprises the first speech-unit of the speech-units.

16. The speech recognition method as claimed in claim 11, further comprising:
after the step of updating the speech-units based on the optimal component, generating a second speech-unit sequence corresponding to the second speech signal based on the updated speech-units, wherein the second speech-unit sequence comprises the second speech-unit; and
performing an iterative operation based on the second speech-unit sequence to update the speech-units.

17. The speech recognition method as claimed in claim 16, further comprising:
after the step of updating the speech-units based on the optimal component, calculating a first score corresponding to the second speech signal based on the second speech-unit sequence, and determining whether the first score is lower than a second score of a best recognition result of the second speech signal;
deleting the second speech-unit of the speech-units when the first score is lower than the second score; and
retaining the second speech-unit of the speech-units when the first score is not lower than the second score.

18. The speech recognition method as claimed in claim 17, further comprising: after the step of retaining the second speech-unit of the speech-units,
calculating a plurality of normalization scores of first basic components corresponding to the second state based on a ranking result of a first basic component of acoustic model corresponding to the second state;
calculating a plurality of normalization scores of second basic components corresponding to the third state based on a ranking result of a second basic component of acoustic model corresponding to the third state;
updating a corresponding relationship between the second state and the basic components of acoustic models based on the normalization scores of first basic components;
updating a corresponding relationship between the third state and the basic components of acoustic models based on the normalization scores of second basic components;

storing the word and the second speech-unit sequence corresponding to the second speech signal.

19. The speech recognition method as claimed in claim 11, further comprising:
receiving a phonetic symbol corresponding to the second speech signal,
wherein the step of selecting the optimal component from the basic components of acoustic models of the speech recognition model based on the speech recognition model, the second speech signal, and the word corresponding to the second speech signal comprises:
selecting the optimal component from the basic components of acoustic models based on the speech recognition model, the second speech signal, the word corresponding to the second speech signal, and the phonetic symbol.

20. The speech recognition method as claimed in claim 19, further comprising:
before the step of selecting the optimal component from the basic components of acoustic models based on the speech recognition model, the second speech signal, and the word corresponding to the second speech signal,
generating a first speech-unit sequence corresponding to the second speech signal based on the phonetic symbol, wherein the first speech-unit sequence comprises the first speech-unit of the speech-units.

21. A vocabulary establishing method, comprising:
storing a speech recognition model having a plurality of speech-units and a plurality of basic components of acoustic models, wherein each of the speech-units has at least one state, and each of the at least one state corresponds to at least one of the basic components of acoustic models;
receiving a speech signal and a word corresponding to the speech signal; and
selecting an optimal component from the basic components of acoustic models based on the speech recognition model, the speech signal, and the word corresponding to the speech signal, and updating the speech-units based on the optimal component,
wherein the step of updating the speech-units based on the optimal component comprises:
determining whether the first speech-unit among the speech-units is a native speech-unit or a new speech-unit;
adding a second speech-unit to the speech-units when the first speech-unit is the native speech-unit, wherein the state of the second speech-unit comprises a second state and a third state, the second state corresponds to the optimal component, and the third state corresponds to a third basic component of acoustic model corresponding to a fourth state of the first speech-unit; and
updating the first speech-unit to the second speech-unit of the speech-units when the first speech-unit is the new speech-unit, wherein the state of the second speech-unit comprises the second state and the third state, the second state corresponds to the optimal component, and the third state corresponds to the third basic component of acoustic model corresponding to the fourth state of the first speech-unit.

22. The vocabulary establishing method as claimed in claim 21, before the step of selecting the optimal component from the basic components of acoustic models based on the speech recognition model, the speech signal, and the word corresponding to the speech signal, generating a first speech-unit sequence corresponding to the speech signal based on the speech-units,
wherein the first speech-unit sequence comprises the first speech-unit of the speech-units.

23. The vocabulary establishing method as claimed in claim 22, further comprising: after the operation of generating the first speech-unit sequence corresponding to the speech signal based on the speech-units and before the step of selecting the optimal component from the basic components of acoustic models based on the speech recognition model, the speech signal, and the word corresponding to the speech signal, segmenting the speech signal into a plurality of speech segments based on a plurality of feature-vectors of the speech signal and the first speech-unit sequence,
wherein a first speech segment of the speech segments corresponds to a first state of the first speech-unit, and the first state corresponds to a first basic component of acoustic model in the basic components of acoustic models.

24. The vocabulary establishing method as claimed in claim 23, wherein the step of selecting the optimal component from the basic components of acoustic models based on the speech recognition model, the speech signal, and the word corresponding to the speech signal comprises:
comparing the first speech segment with the basic components of acoustic models; and
selecting a second basic component of acoustic model as the optimal component when a degree of matching for the first speech segment with the second basic component of acoustic model in the basic components of acoustic models is higher than a degree of matching for the first speech segment with the first basic component of acoustic model.

25. The vocabulary establishing method as claimed in claim 21, further comprising: before the step of selecting the optimal component from the basic components of acoustic models based on the speech recognition model, the speech signal, and the word corresponding to the speech signal, selecting a first speech-unit sequence from a plurality of predetermined speech-unit sequences based on the speech signal, wherein the first speech-unit sequence comprises the first speech-unit of the speech-units.

26. The vocabulary establishing method as claimed in claim 21, further comprising:
after the step of updating the speech-units based on the optimal component, generating a second speech-unit sequence corresponding to the speech signal based on the updated speech-units, wherein the second speech-unit sequence comprises the second speech-unit; and
performing an iterative operation based on the second speech-unit sequence to update the speech-units.

27. The vocabulary establishing method as claimed in claim 26, further comprising:
after the step of updating the speech-units based on the optimal component, calculating a first score corresponding to the speech signal based on the second speech-unit sequence, and determining whether the first score is lower than a second score of a best recognition result of the speech signal;
deleting the second speech-unit of the speech-units when the first score is lower than the second score; and
retaining the second speech-unit of the speech-units when the first score is not lower than the second score.

28. The vocabulary establishing method as claimed in claim 27, further comprising: after the step of retaining the second speech-unit of the speech-units, calculating a plurality of normalization scores of first basic components corresponding to the second state based on a ranking result of a first basic component of acoustic model corresponding to the second state;

calculating a plurality of normalization scores of second basic components corresponding to the third state based on a ranking result of a second basic component of acoustic model corresponding to the third state;

updating a corresponding relationship between the second state and the basic components of acoustic models based on the normalization scores of first basic components; and updating a corresponding relationship between the third state and the basic components of acoustic models based on the normalization scores of second basic components;

storing the word and the second speech-unit sequence corresponding to the speech signal.

29. The vocabulary establishing method as claimed in claim 21, further comprising:

receiving a phonetic symbol corresponding to the speech signal, wherein the step of selecting the optimal component from the basic components of acoustic models of the speech recognition model based on the speech recognition model, the speech signal, and the word corresponding to the speech signal comprises:

selecting the optimal component from the basic components of acoustic models based on the speech recognition model, the speech signal, the word corresponding to the speech signal, and the phonetic symbol.

30. The vocabulary establishing method as claimed in claim 29, further comprising:

before the step of selecting the optimal component from the basic components of acoustic models based on the speech recognition model, the speech signal, and the word corresponding to the speech signal, generating a first speech-unit sequence corresponding to the speech signal based on the phonetic symbol, wherein the first speech-unit sequence comprises the first speech-unit of the speech-units.

31. A non-transitory computer-readable medium containing computer program product comprising at least one program instruction, wherein the at least one program instruction is loaded to a computer to perform the steps of the method as claimed in claim 11.

* * * * *